US012659142B2

(12) United States Patent
Doi et al.

(10) Patent No.: US 12,659,142 B2
(45) Date of Patent: Jun. 16, 2026

(54) INFORMATION PROCESSING DEVICE, QUANTUM CRYPTOGRAPHIC COMMUNICATION SYSTEM, KEY MANAGEMENT DEVICE, INFORMATION PROCESSING METHOD, AND COMPUTER PROGRAM PRODUCT

(71) Applicant: KABUSHIKI KAISHA TOSHIBA, Tokyo (JP)

(72) Inventors: Kazuaki Doi, Kawasaki (JP); Keisuke Mera, Tokyo (JP); Yutaro Ishigaki, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 22 days.

(21) Appl. No.: 18/762,097

(22) Filed: Jul. 2, 2024

(65) Prior Publication Data

US 2025/0080339 A1 Mar. 6, 2025

(30) Foreign Application Priority Data

Sep. 5, 2023 (JP) .................................. 2023-143626

(51) Int. Cl.
*H04L 9/08* (2006.01)
(52) U.S. Cl.
CPC .................................. *H04L 9/0852* (2013.01)
(58) Field of Classification Search
CPC ............................ H04L 9/0852; H04L 9/0858
See application file for complete search history.

(56) References Cited

U.S. PATENT DOCUMENTS

2015/0036824 A1* 2/2015 Dixon ................... H04L 9/0852
                                                             380/279
2015/0193306 A1* 7/2015 Doi ....................... H04L 9/0858
                                                             714/746

(Continued)

FOREIGN PATENT DOCUMENTS

CN      111490869 A      8/2020
JP      2015-99310 A      5/2015
JP      2021-170742 A    10/2021

OTHER PUBLICATIONS

Hong-fei Zhang et al., "A real-time QKD system based on FPGA," Journal of Lightwave Technology, vol. 30, No. 20, 7 pages (2012).

(Continued)

*Primary Examiner* — Baotran N To
(74) *Attorney, Agent, or Firm* — Finnegan, Henderson, Farabow, Garrett & Dunner, LLP

(57) ABSTRACT

According to an embodiment, an information processing device includes a processor that divides input data based on photons received via a quantum cryptographic communication channel into a plurality of pieces of first divided data, obtains first numeric theory translation data of the first divided data by performing numeric theory translation on the plurality of pieces of first divided data, divides a Toeplitz matrix into a plurality of pieces of second divided data, obtains second numeric theory translation data of the second divided data by performing numeric theory translation on the plurality of pieces of second divided data, and performs privacy amplification processing on the input data based on a result obtained by performing inverse numeric theory translation on a multiplication result obtained by multiplying the first numeric theory translation data and the second numeric theory translation data.

13 Claims, 23 Drawing Sheets

(56) References Cited

U.S. PATENT DOCUMENTS

| | | | |
|---|---|---|---|
| 2015/0195087 A1* | 7/2015 | Doi | H04L 9/0852 |
| | | | 380/278 |
| 2016/0277183 A1* | 9/2016 | Murakami | H04L 9/0858 |
| 2020/0351086 A1 | 11/2020 | Walenta et al. | |
| 2021/0328784 A1 | 10/2021 | Doi et al. | |

OTHER PUBLICATIONS

Bang-Ying Tang et al., "High-speed and Large-scale Privacy Amplifcation Scheme for Quantum Key Distribution," Scientific Reports, vol. 9, No. 15733, 8 pages (2019).
Xiangyu Wang et al., "High-Speed Implementation of Length-Compatible Privacy Amplification in Continuous-Variable Quantum Key Distribution," IEEE Photonics Journal, vol. 10, No. 3 Art. 7600309, DOI: 10.1109/JPHOT.2018.2824316, 10 pages (2018).
Qiong Li et al., "High-speed Implementation of FFT-based Privacy Amplification on FPGA in Quantum Key Distribution," arXiv:1809. 07592, XP080919342, 10 pages (2018).
Bingze Yan et al., "High-Speed Privacy Amplification Scheme using GMP in Quantum Key Distribution," XP081513414, 5 pages (2019).
European Patent Office, Extended European Search Report in EP App. No. 24186649.0, 10 pages (Dec. 16, 2024).
Japan Patent Office, Office Action in JP App. No. 2023-143626 (Feb. 3, 2026).
Bang-Ying Tang, et al., "High-speed and Large-scale Privacy Amplification Scheme for Quantum Key Distribution," Scientific Reports, vol. 9, Art. 15733, DOI: 10.1038/s41598-019-50290-1, 8 pages (2019).

* cited by examiner

INPUT DATA
(EC DATA)

TOEPLITZ MATRIX

OUTPUT DATA
(QUANTUM
CRYPTOGRAPHIC KEY)

INPUT DATA
(EC DATA)

T-MATRIX VECTOR

OUTPUT DATA
(QUANTUM
CRYPTOGRAPHIC KEY)

FIG.7A
S1: EXECUTE NTT
| e | d | c | b | a |
|---|---|---|---|---|
INPUT DATA (EC DATA)      NTT
| v | w | ... | y | z |
|---|---|---|---|---|
NTT DATA FOR INPUT DATA
| A | B | ... | H | I |
|---|---|---|---|---|
T-MATRIX VECTOR      NTT
| V | W | ... | Y | Z |
|---|---|---|---|---|
NTT DATA FOR
T-MATRIX VECTOR
FIG.7B
S2: MULTIPLY PIECES OF NTT DATA TOGETHER
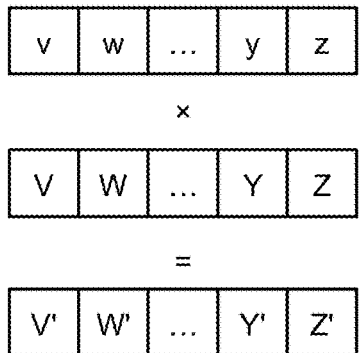
MULTIPLY PIECES OF NTT DATA TOGETHER
FIG.7C
S3: EXECUTE INTT
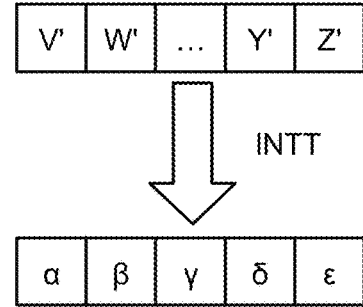
INTT
OUTPUT DATA
(QUANTUM CRYPTOGRAPHIC KEY)

PA PROCESSING UNIT    16

MEMORY UNIT    161

| INPUT DATA MEMORY 1611 | OUTPUT DATA MEMORY 1612 | NTT MULTIPLICATION DATA MEMORY 1615 |

NTT DATA MEMORY (FOR INPUT DATA) 1613

NTT DATA MEMORY (FOR T-MATRIX) 1614

PROCESSING UNIT    162

NTT ARITHMETIC UNIT 1621

INTT ARITHMETIC UNIT 1622

DATA CONTROL UNIT 1623

FIG.9A

S11: DIVIDE INPUT DATA AND T-MATRIX INTO N1 BITS

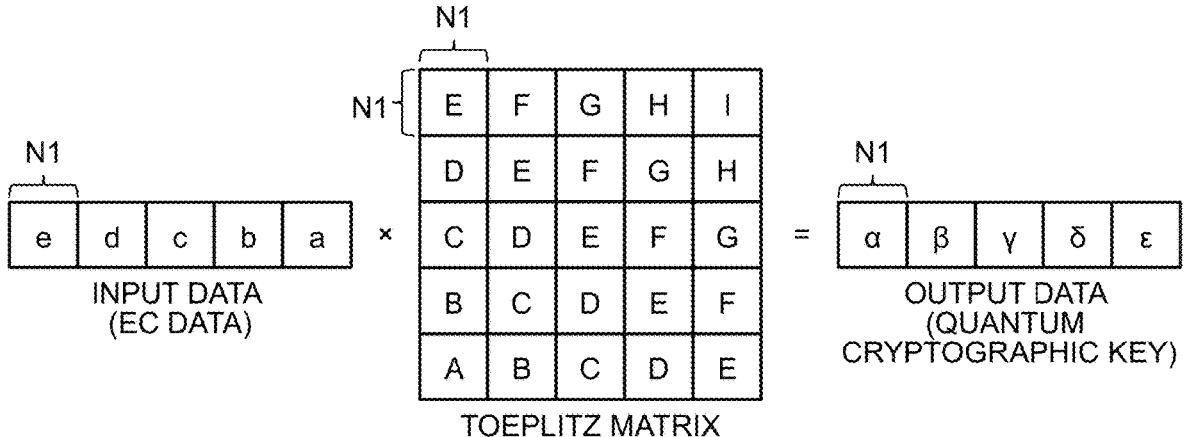

INPUT DATA
(EC DATA)

TOEPLITZ MATRIX

OUTPUT DATA
(QUANTUM
CRYPTOGRAPHIC KEY)

FIG.9B

S12: CALCULATE INPUT DATA AND
T-MATRIX INDEPENDENTLY FOR EACH DIVIDED REGION
(CALCULATE a × A BY USING NTT)

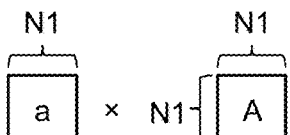

FIG.9C

S13: SEQUENTIALLY PERFORM XOR OPERATION ON
CALCULATION RESULTS OF DIVIDED REGIONS
TOGETHER TO CALCULATE OUTPUT DATA $$\alpha = \mathrm{xor}(\; a \times A,\; b \times B,\; ...,\; e \times E\;)$$

INPUT DATA
(EC DATA)

TOEPLITZ MATRIX

S21: NTT ON INPUT DATA

N1

INPUT DATA

NTT FOR EACH
DIVIDED REGION

NTT DATA FOR EACH DIVIDED
REGION OF INPUT DATA

S22: NTT ON T-MATRIX

N1

N1

TOEPLITZ MATRIX

NTT FOR EACH
DIVIDED REGION

NTT DATA FOR EACH DIVIDED
REGION OF T-MATRIX
(FIRST DIVIDED COLUMN)

S23: MULTIPLY PIECES OF NTT DATA TOGETHER

| e' | d' | c' | b' | a' |

.*

MULTIPLICATION FOR
EACH DIVIDED REGION

| E' | D' | C' | B' | A' |

=

| $\alpha_5'$ | $\alpha_4'$ | $\alpha_3'$ | $\alpha_2'$ | $\alpha_1'$ |

S24: INTT

| α_5' | α_4' | α_3' | α_2' | α_1' |

INTT FOR EACH
DIVIDED REGION

| α_5 | α_4 | α_3 | α_2 | α_1 |

S25: XOR OPERATION

α=XOR (α_1, …, α_5)

S31: NTT ON INPUT DATA

INPUT DATA

NTT

NTT DATA FOR DIVIDED
REGION OF INPUT DATA

S32: NTT ON T-MATRIX

TOEPLITZ MATRIX

NTT FOR EACH
DIVIDED REGION

NTT DATA FOR EACH
DIVIDED REGION OF T-MATRIX
(FIRST DIVIDED ROW)

S33: MULTIPLY PIECES OF NTT DATA TOGETHER

MULTIPLICATION FOR
EACH DIVIDED REGION

S34: INTT

INTT FOR EACH
DIVIDED REGION

S35: XOR OPERATION $\alpha = XOR(\alpha\_1, \alpha)$
$\beta = XOR(\beta\_1, \beta)$
$\gamma = XOR(\gamma\_1, \gamma)$
$\delta = XOR(\delta\_1, \delta)$
$\varepsilon = XOR(\varepsilon\_1, \varepsilon)$

TOEPLITZ MATRIX

TOEPLITZ MATRIX

SECOND DIVIDED ROW
HAS CONFIGURATION OBTAINED
BY DELETING A FROM FIRST DIVIDED
ROW AND NEWLY ADDING F

TOEPLITZ MATRIX

N1

| e | d | c | b | a |

INPUT DATA

STORE ENTIRE
INPUT DATA

N1

N1

| E | F | G | H | I |
| D | E | F | G | H |
| C | D | E | F | G |
| B | C | D | E | F |
| A | B | C | D | E |

TOEPLITZ MATRIX

STORE ENTIRE
DIVIDED COLUMN

INPUT DATA
(EC DATA)

STORE INPUT DATA OF
ONE DIVIDED REGION

TOEPLITZ MATRIX

STORE ENTIRE
DIVIDED ROW

WHEN COMPRESSION RATIO IS 2/5,
CALCULATION IS PERFORMED
ON TWO COLUMNS

WHEN COMPRESSION RATIO IS 3/5,
CALCULATION IS PERFORMED
ON THREE COLUMNS

FIG.19
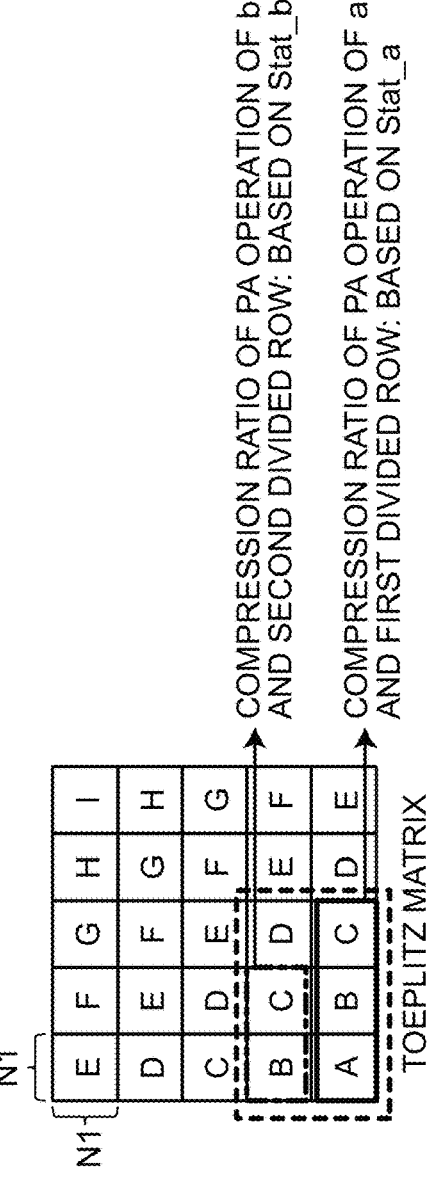
COMPRESSION RATIO OF PA OPERATION OF b AND SECOND DIVIDED ROW: BASED ON Stat_b
COMPRESSION RATIO OF PA OPERATION OF a AND FIRST DIVIDED ROW: BASED ON Stat_a
TOEPLITZ MATRIX
×
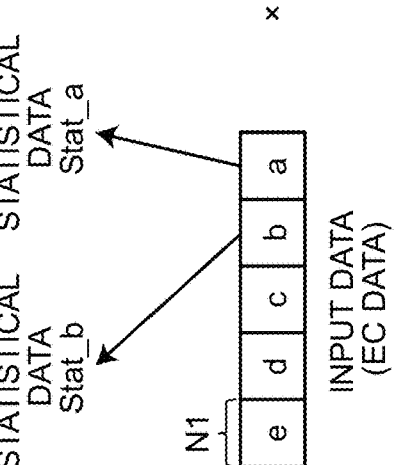
STATISTICAL DATA Stat_a
STATISTICAL DATA Stat_b
INPUT DATA (EC DATA)

OUTPUT RANGE VARIES WITH EACH ROW
(IN FIGURE ABOVE, QbER_b>QbER_a)

COMPRESSION RATIO OF FIRST DIVIDED ROW:
AFFECTED BY QbER_a (QbER OF DIVIDED REGION a)
COMPRESSION RATIO OF SECOND DIVIDED ROW:
AFFECTED BY QbER_b (QbER OF DIVIDED REGION b)
...AND SO ON

INFORMATION PROCESSING DEVICE, QUANTUM CRYPTOGRAPHIC COMMUNICATION SYSTEM, KEY MANAGEMENT DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2023-143626, filed on Sep. 5, 2023; the entire contents of which are incorporated herein by reference.

FIELD

Embodiments described herein relate generally to an information processing device, a quantum cryptographic communication system, a key management device, an information processing method, and a computer program product.

BACKGROUND

With the development of information communication technologies, a wide variety of data has been exchanged, and ensuring the privacy, security, and the like of transmitted information has become a major issue. A quantum cryptographic communication technique is expected to be put to practical use as a cryptographic technique that cannot be deciphered even if the computing power of computers is improved. In privacy amplification processing of quantum cryptographic communications, for example, multiplication of error correction data and a Toeplitz matrix is performed. However, it is difficult for the conventional technique to perform privacy amplification processing with less memory usage.

BRIEF DESCRIPTION OF THE DRAWINGS

FIG. 7A is a diagram of Example 3 (operation using NTT) of the PA;

FIG. 7B is a diagram of Example 3 (operation using NTT) of the PA;

FIG. 7C is a diagram of Example 3 (operation using NTT) of the PA;

FIG. 9A is a diagram of an example of calculation of output data by a dividing method according to the embodiment;

FIG. 9B is a diagram of an example of calculation of the output data by the dividing method according to the embodiment;

FIG. 9C is a diagram of an example of calculation of the output data by the dividing method according to the embodiment;

FIG. 19 is a diagram for explaining the compression ratio of each divided row in the row method according to the embodiment;

DETAILED DESCRIPTION

In general, according to one embodiment, an information processing device includes a processor configured to: divide input data based on photons received via a quantum cryptographic communication channel into a plurality of pieces of first divided data; obtain first numeric theory translation data of the first divided data by performing numeric theory translation on the plurality of pieces of first divided data; divide a Toeplitz matrix into a plurality of pieces of second divided data; obtain second numeric theory translation data of the second divided data by performing numeric theory translation on the plurality of pieces of second divided data; and perform privacy amplification processing on the input data based on a result obtained by performing inverse numeric theory translation on a multiplication result obtained by multiplying the first numeric theory translation data and the second numeric theory translation data.

Exemplary embodiments of an information processing device, a quantum cryptographic communication system, a key management device, an information processing method, and a computer program product will be explained below in detail with reference to the accompanying drawings. The present invention is not limited to the following embodiments.

An example of the device configuration of the quantum cryptographic communication system according to an embodiment is described first.

Example of the Device Configuration

Figure 1:
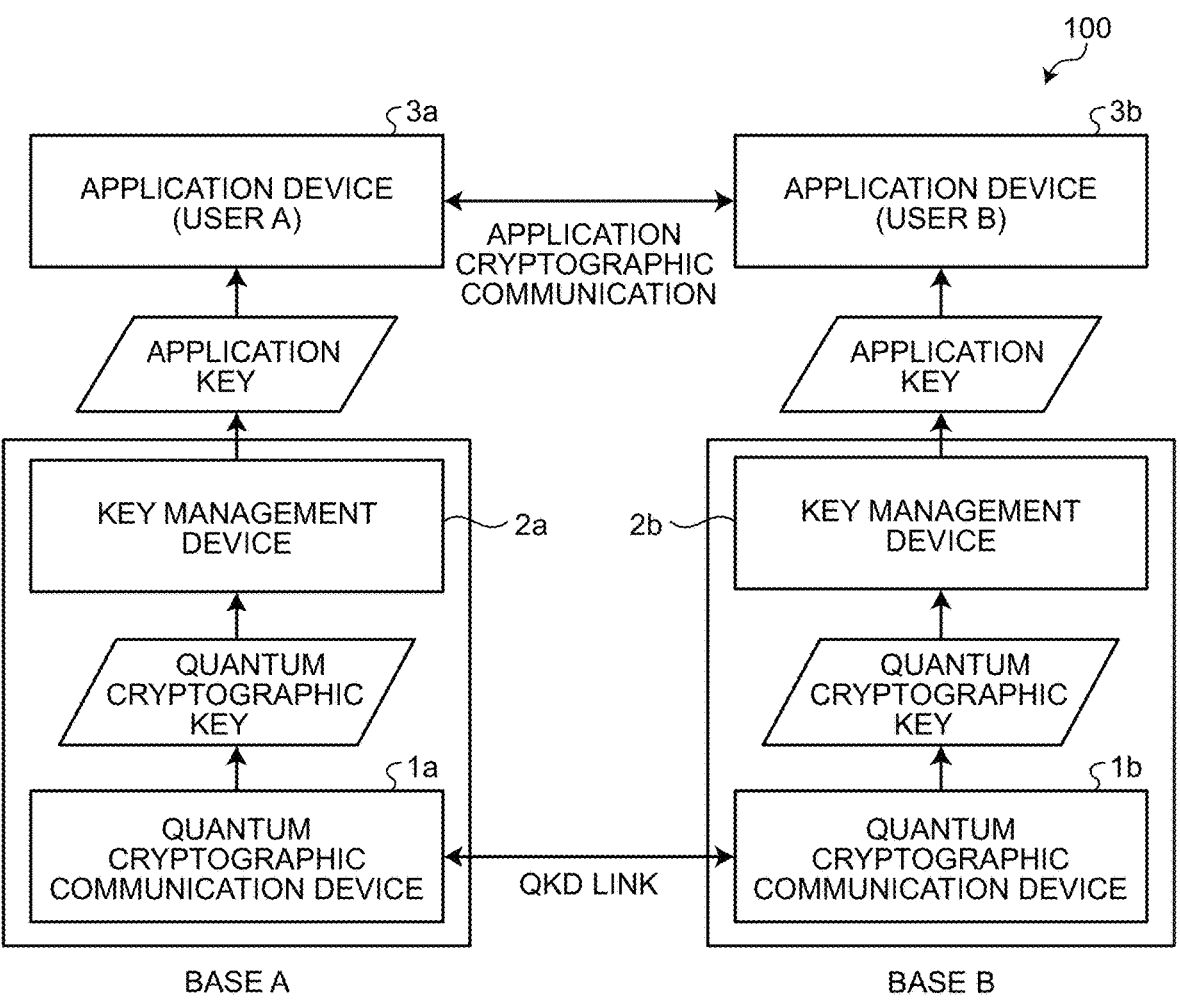
FIG. 1 is a diagram of an example of the device configuration of a quantum cryptographic communication system according to an embodiment.

FIG. 1 is a diagram of an example of the device configuration of a quantum cryptographic communication system 100 according to the embodiment. The quantum cryptographic communication system 100 according to the embodiment includes quantum cryptographic communication devices 1*a* and 1*b*, key management devices 2*a* and 2*b*, and application devices 3*a* and 3*b*. The quantum cryptographic communication device 1*a* and the key management device 2*a* are installed at a base A. The quantum cryptographic communication device 1*b* and the key management device 2*b* are installed at a base B.

The quantum cryptographic communication device 1*a* supplies a quantum cryptographic key shared with the quantum cryptographic communication device 1*b* via a quantum key distribution (QKD) link to the key management device 2*a*.

The key management device 2*a* stores therein the quantum cryptographic key supplied from the quantum cryptographic communication device 1*a* as an application key.

The application device 3*a* is a device on which an application used by a user A is installed. The application device 3*a* requests the application key from the key management device 2*a* and acquires the application key from the key management device 2*a*. The application key is used for application cryptographic communications with the application device 3*b* on which an application used by a user B is installed.

Explanation of the quantum cryptographic communication device 1*b*, the key management device 2*b*, and the application device 3*b* is omitted because they are the same as the quantum cryptographic communication device 1*a*, the key management device 2*a*, and the application device 3*a*.

In the following description, the quantum cryptographic communication devices 1*a* and 1*b* are simply referred to as quantum cryptographic communication devices 1 when they are not distinguished from each other. Similarly, the key management devices 2*a* and 2*b* are simply referred to as key management devices 2 when they are not distinguished from each other. Similarly, the application devices 3*a* and 3*b* are simply referred to as application devices 3 when they are not distinguished from each other.

Figure 2:
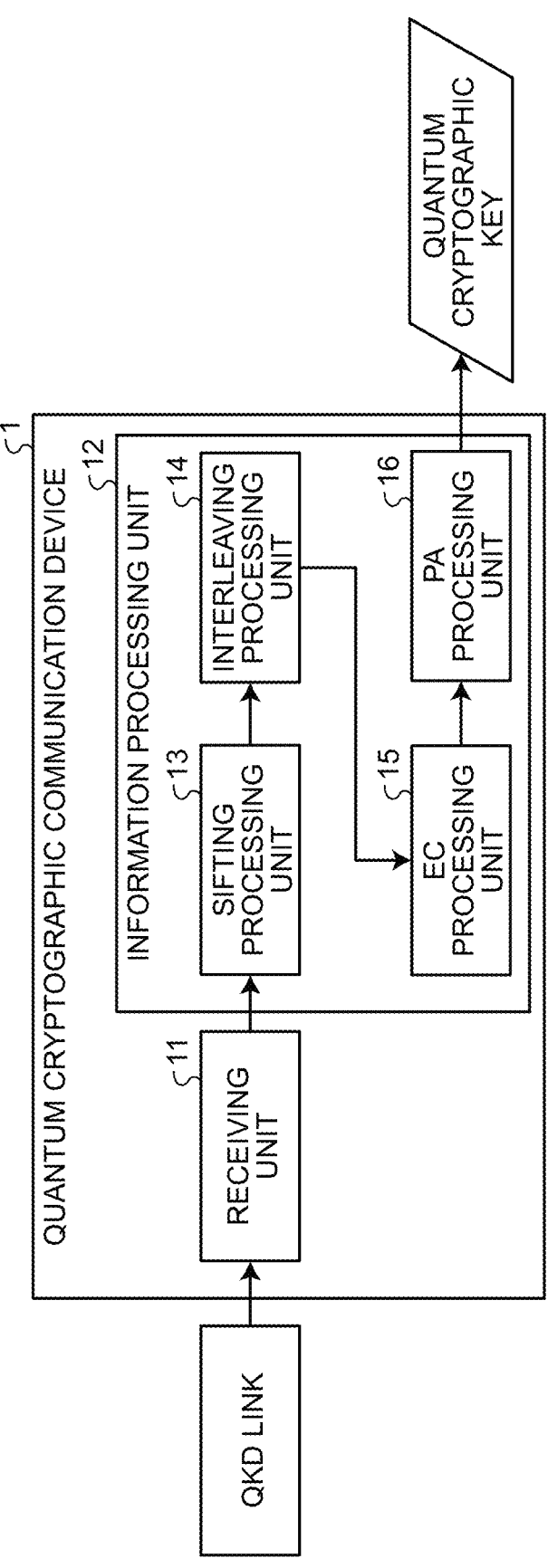
FIG. 2 is a diagram of an example of the functional configuration of a quantum cryptographic communication device according to the embodiment.

Example of the Functional Configuration of the Quantum Cryptographic Communication Device FIG. 2 is a diagram of an example of the functional configuration of the quantum cryptographic communication device 1 according to the embodiment. The quantum cryptographic communication device 1 according to the embodiment includes a receiving unit 11 and an information processing unit 12. The information processing unit 12 includes a sifting processing unit 13, an interleaving processing unit 14, an error correction (EC) processing unit 15, and a privacy amplification (PA) processing unit 16.

The receiving unit 11 receives photons from the QKD link and inputs them to the information processing unit 12.

The information processing unit 12 is implemented by at least one processor and performs the processing of the quantum cryptographic communication device 1. The processor includes a control device and an arithmetic device, for example, and is implemented by an analog or digital circuit or the like. The processor may be a central processing unit (CPU). Alternatively, the processor may be a general-purpose processor, a microprocessor, a digital signal processor (DSP), an application specific integrated circuit (ASIC), a field-programmable gate array (FPGA), or combinations thereof.

The sifting processing unit 13 performs sifting to obtain a sifted key by referring to photon data in units of a predetermined bit column by a reference basis randomly selected from a plurality of bases. The interleaving processing unit 14 performs interleaving (order conversion) processing on the sifted key output from the sifting processing unit 13.

The EC processing unit 15 corrects errors included in the sifted key to obtain EC data. The PA processing unit 16 performs privacy amplification processing on the EC data.

A well-known method for privacy amplification processing of quantum cryptographic communications is multiplication of error correction data and a Toeplitz matrix. To increase the security of quantum cryptographic communications, it is necessary to make the size of the Toeplitz matrix huge. Therefore, the amount of operation (especially, the amount of memory) required to perform privacy amplification processing is very large, which is a major obstacle to implementing privacy amplification in a circuit, such as a field-programmable gate array (FPGA).

While the privacy amplification processing according to the embodiment described below is more easily implemented in an electronic circuit, such as an FPGA, the entire information processing unit 12 for quantum cryptographic communications may be implemented in the FPGA or the like as illustrated in FIG. 2. In other words, four units of the sifting processing unit 13, the interleaving processing unit 14, the EC processing unit 15, and the PA processing unit 16 are to be implemented.

The configuration of the processing functions of the information processing unit 12 may be appropriately modified. For example, if interleaving processing is not performed, the configuration of the information processing unit 12 without the interleaving processing unit 14 can be implemented in the FPGA.

The privacy amplification processing according to the embodiment is implemented in the quantum cryptographic communication devices 1a and 1b at both bases (bases A and B in FIG. 1).

If the quantum cryptographic keys output from the quantum cryptographic communication devices 1a and 1b at both bases are identical, the privacy amplification processing according to the embodiment may be implemented in one of the bases. The privacy amplification is, however, preferably implemented in both bases because synchronizing the processing contents as much as possible can ensure a stable operation.

The privacy amplification processing using a Toeplitz matrix is simply described first. In the present embodiment, the privacy amplification processing is hereinafter abbreviated as PA processing, and the Toeplitz matrix is abbreviated as a T-matrix.

An outline of information processing for quantum cryptographic communications (processing for generating a quantum cryptographic key from received photons) is described first. An outline of information processing by a receiver is illustrated in FIG. 3.

Figure 3:
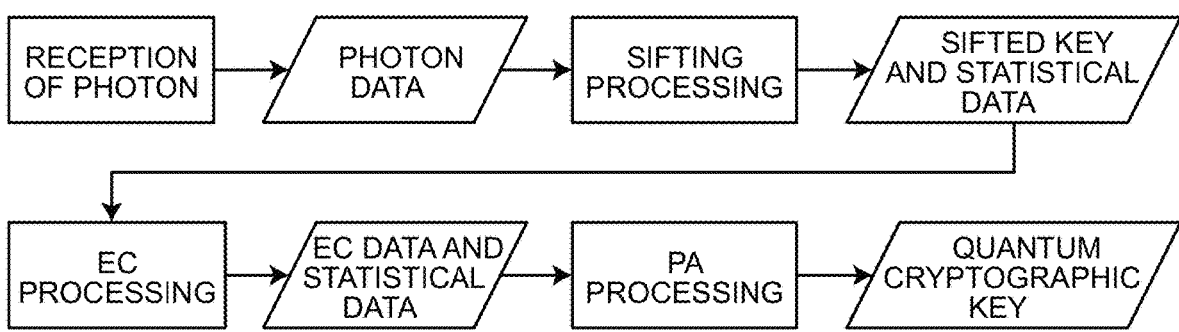
FIG. 3 is a diagram of an outline of generation of a quantum cryptographic key according to the embodiment.

FIG. 3 is a diagram of an outline of generation of a quantum cryptographic key according to the embodiment. First, the quantum cryptographic communication device 1a serving as a transmitter transmits photons, which are the source of the quantum cryptographic key, to the quantum cryptographic communication device 1b serving as a receiver. The quantum cryptographic communication device 1b serving as the receiver receives the photons from the quantum cryptographic communication device 1a serving as the transmitter and obtains photon data.

Next, the quantum cryptographic communication device 1b serving as the receiver obtains a sifted key and statistical data of a quantum cryptographic communication channel based on information, such as the timing of the arrival of the photons at the transmitter and the receiver, in sifting processing by the sifting processing unit 13.

Subsequently, the quantum cryptographic communication device 1b serving as the receiver corrects errors included in the sifted key and obtains EC data by error correction (EC) processing performed by the EC processing unit 15.

Finally, the quantum cryptographic communication device 1b serving as the receiver improves the security on the information security of the EC data and generates a quantum cryptographic key by the PA performed by the PA processing unit 16.

Explanation of the processing of the quantum cryptographic communication device 1a serving as the transmitter is omitted because it is equivalent to the procedure of the processing of the quantum cryptographic communication device 1b serving as the receiver.

The following describes an outline of the PA. The outline of the PA is illustrated in FIG. 4.

Figure 4:
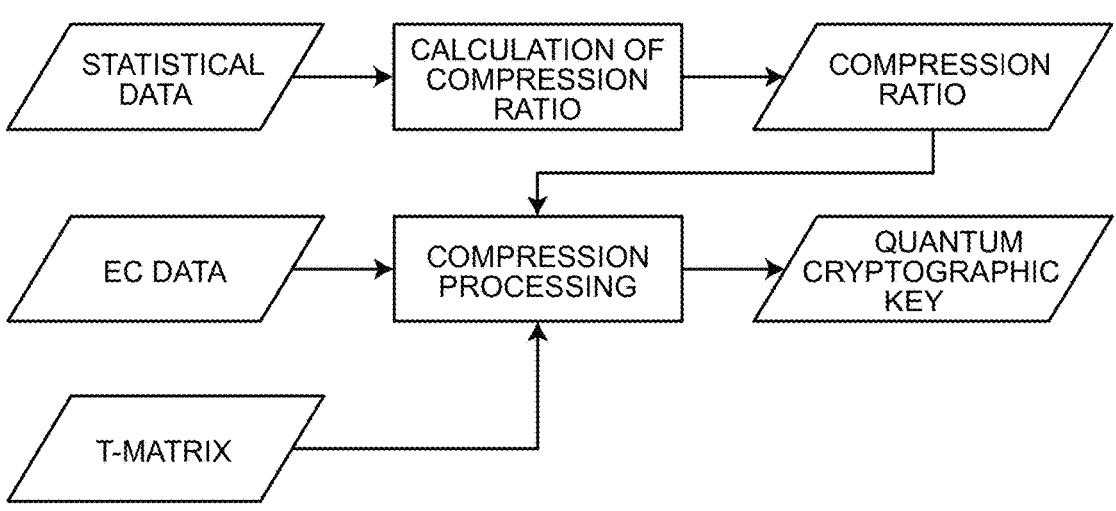
FIG. 4 is a diagram of an outline of PA according to the embodiment.

FIG. 4 is a diagram of an outline of the PA according to the embodiment. First, the PA processing unit 16 uses statistical data to calculate a compression ratio. The PA processing unit 16 uses the compression ratio, the EC data, and the T-matrix to generate a quantum cryptographic key. The compression ratio refers to the ratio between the data size of the input EC data and the data on the output quantum cryptographic key and is expressed by: Compression Ratio=Size of Quantum Cryptographic Key/Size of EC Data.

The following describes the calculation method for compression processing in the PA using the T-matrix. There are mainly three calculation methods: matrix operation, convolution operation, and operation using numeric theory translation (NTT).

Figure 5:
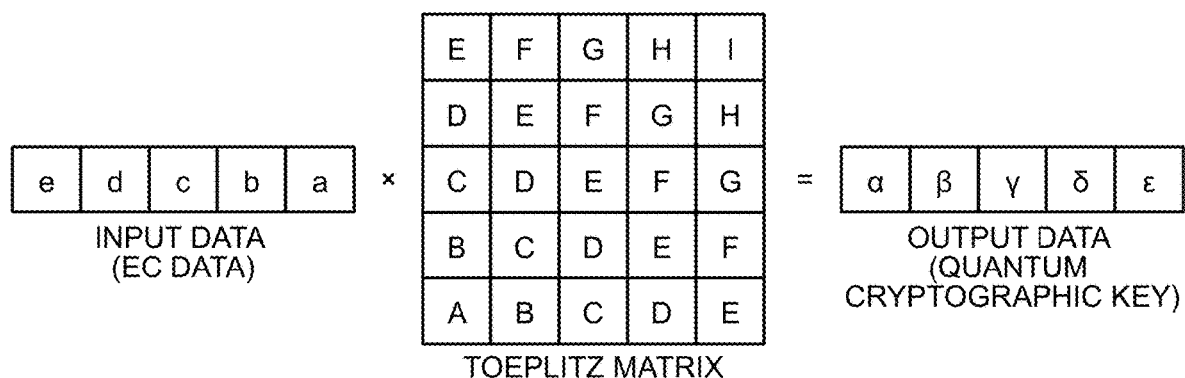
FIG. 5 is a diagram of Example 1 (matrix operation) of the PA.

FIG. 5 is a diagram of Example 1 (matrix operation) of the PA. As illustrated in FIG. 5, matrix multiplication of the EC data and the T-matrix is performed in the PA by matrix operation.

As described above, the size of the quantum cryptographic key varies with the compression ratio. The ratio between the row size and the column size of the T-matrix is determined based on the compression ratio. When the compression ratio is 0.6, for example, the column size is 0.6 times the row size. Typically, the size of input data is fixed. Therefore, the ratio between the row size and the column size of the T-matrix is changed by changing the column size of the T-matrix.

Figure 6:
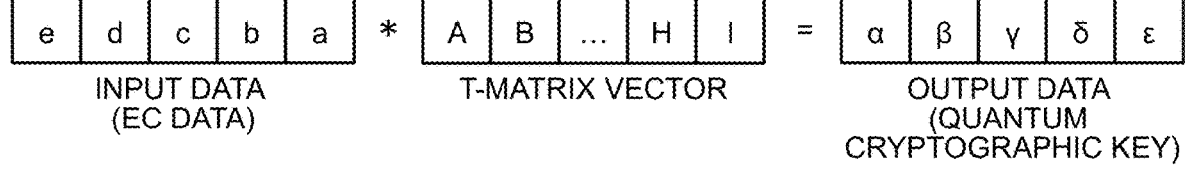
FIG. 6 is a diagram of Example 2 (convolution operation) of the PA.

FIG. 6 is a diagram of Example 2 (convolution operation) of the PA. As illustrated in FIG. 6, a convolution operation of the input data and a T-matrix vector is performed in the PA by convolution operation. The T-matrix vector is data obtained by connecting the first column and the first row of the T-matrix in FIG. 5.

The T-matrix is a matrix with the property that the same data appears toward a diagonal direction. For example, E serving as the top-leftmost element of the T-matrix in FIG. 5 appears toward the diagonal direction (lower right). Due to the property of the T-matrix, matrix multiplication and convolution operation are equivalent in the calculation results.

FIGS. 7A to 7C are diagrams of Example 3 (operation using NTT) of the PA. Due to the property of NTT, the convolution operation in FIG. 6 is equivalent to the operation illustrated in FIGS. 7A to 7C.

First, NTT is performed on each data, and NTT data for each data is obtained (Step S1). Next, the pieces of NTT data obtained at Step S1 are multiplied together (Step S2). Finally, inverse NTT (INTT) is performed on the multiplied data obtained at Step S2 to obtain output data (Step S3).

The operation using NTT is typically used because the operation using NTT has the smallest amount of operation in the PA. Considering the security of quantum cryptographic communications, however, it is necessary to increase the data size of the input data and the T-matrix. As a result, the data size of the NTT data in the PA naturally increases. This causes the problem that the memory size required for the PA becomes very large.

The PA processing unit 16 according to the embodiment performs the PA by the operation using NTT.

Figure 8:
FIG. 8 is a diagram of an example of the functional configuration of a PA processing unit according to the embodiment.

FIG. 8 is a diagram of an example of the functional configuration of the PA processing unit 16 according to the embodiment. In the case of implementing the PA processing unit 16 in an electronic circuit, such as an FPGA, the PA processing unit 16 may be implemented in the configuration illustrated in FIG. 8, for example. In other words, the PA processing unit 16 according to the embodiment includes a memory unit 161 and a processing unit 162.

The memory unit 161 includes an input data memory 1611, an output data memory 1612, an NTT data memory 1613 for input data, an NTT data memory 1614 for the T-matrix, and an NTT multiplication data memory 1615.

The input data memory 1611 stores therein input data input to the PA processing unit 16. The output data memory 1612 stores therein output data output from the PA processing unit 16.

The NTT data memory 1613 for input data stores therein NTT data (NTT operation results) for input data. The NTT data memory 1614 for the T-matrix stores therein NTT data (NTT operation results) for the T-matrix. The NTT multiplication data memory 1615 stores therein data obtained by multiplying the NTT data for input data and the NTT data for the T-matrix.

While the memory unit 161 in the example illustrated in FIG. 8 is divided into five memories, the example in FIG. 8 is given by way of example only. The memory unit 161 may be composed of any number of one or more of memories.

The processing unit 162 includes an NTT arithmetic unit 1621, an INTT arithmetic unit 1622, and a data control unit 1623. The NTT arithmetic unit 1621 performs NTT operation. The INTT arithmetic unit 1622 performs INTT operation. The data control unit 1623 controls input and output of various data and controls the entire PA.

The points of the PA according to the present embodiment are as follows:

(1) The input data and the T-matrix are divided.

(2) The number of times of NTT is reduced using the property of the T-matrix.

The point (1) is that a dividing method is used, in which the input data and the T-matrix are divided, the result of multiplication of the input data and the T-matrix is obtained for each divided region, and the output data is obtained by performing XOR operation on the multiplication result of each divided region. This method can reduce the number of points of NTT, thereby reducing the scale of implementation for NTT operation and the storage memory for the NTT data.

The point (2) is that, focusing on the property of the T-matrix described above, the same data appears if the T-matrix is separated by the divided regions. Therefore, if the previously calculated NTT data for a T-matrix vector is stored, when a T-matrix vector having the same pattern appears, the PA processing unit 16 need not perform NTT anew on the T-matrix vector and simply needs to retrieve the stored data. In other words, the number of times of NTT on the T-matrix vector in FIG. 7A can be reduced.

The point (1) is described first in greater detail. The calculation method by the dividing method is illustrated in FIGS. 9A to 9C.

FIGS. 9A to 9C are diagrams of an example of calculation of the output data by the dividing method according to the embodiment.

First, the NTT arithmetic unit 1621 divides the input data and the T-matrix (Step S11). In the example in FIG. 9A, the input data is divided into five parts in units of an N1 bit, and the T-matrix is divided into 25 parts in units of N1×N1 bit.

Next, the NTT arithmetic unit 1621 calculates the input data and the T-matrix independently for each divided region using NTT to obtain the multiplication result of each divided region (Step S12). The calculation method by NTT is described with reference to FIGS. 7A to 7C.

Finally, the NTT arithmetic unit 1621 performs XOR operation on the multiplication results of the divided regions together to obtain the output data for the divided regions (Step S13).

The NTT arithmetic unit 1621 performs the operation for a divided region α illustrated in FIGS. 9A to 9C on the other divided regions (β, γ, δ, and ε) of the output data.

According to the dividing method in FIGS. 9A to 9C, the multiplication results of the input data and the T-matrix can be calculated using at least 2*N1 points of NTT after the division, while at least 10*N1 points of NTT are required if neither the input data nor the T-matrix is divided. By reducing the number of points of NTT from 10*N1 points to 2*N1 points, the data size of the NTT data for the input data and the NTT data for the T-matrix vector can be reduced, and the scale of the calculation circuit for calculating NTT can also be reduced.

Figure 10A:
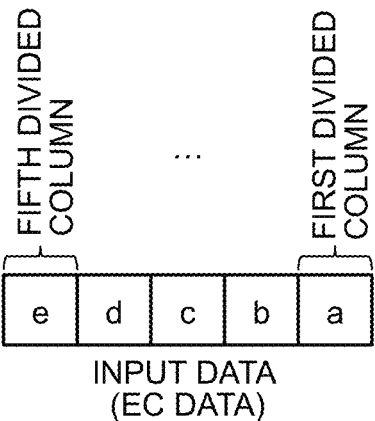
FIG. 10A is a diagram of definition of divided columns of input data according to the embodiment.
Figure 10B:
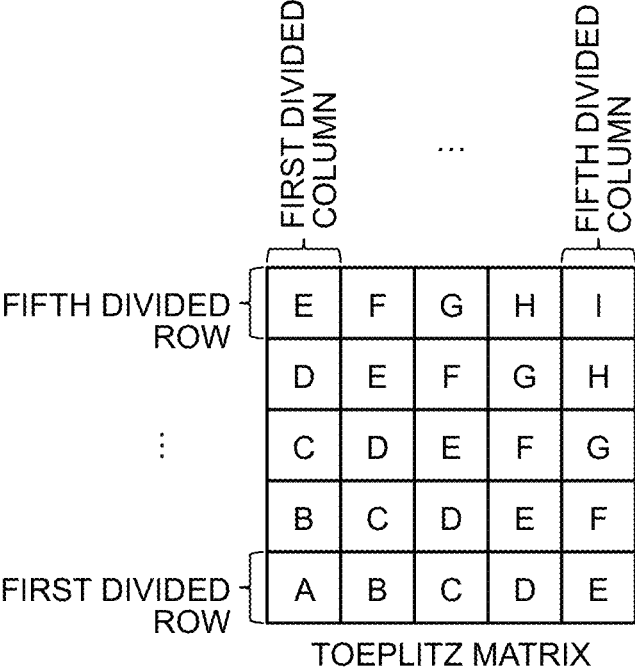
FIG. 10B is a diagram of definition of divided columns and divided rows of a Toeplitz matrix according to the embodiment.
Figure 11A:
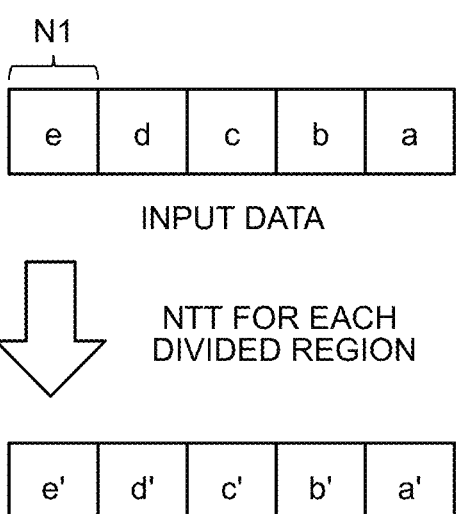
FIG. 11A is a diagram for explaining the procedure of the PA in a column method according to the embodiment.
Figure 11B:
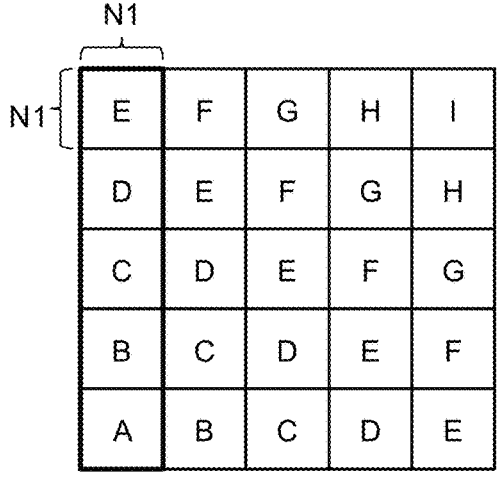
FIG. 11B is a diagram for explaining the procedure of the PA in the column method according to the embodiment.
Figure 11C:
FIG. 11C is a diagram for explaining the procedure of the PA in the column method according to the embodiment.
Figures 11D, 11E:
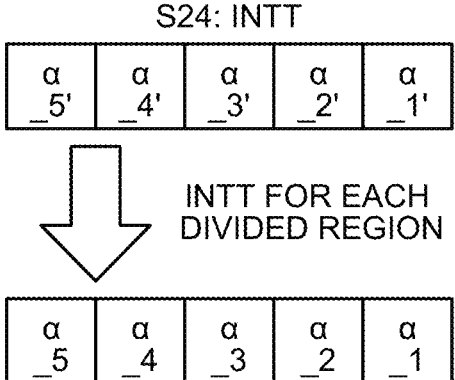
FIG. 11D is a diagram for explaining the procedure of the PA in the column method according to the embodiment.
FIG. 11E is a diagram for explaining the procedure of the PA in the column method according to the embodiment.
Figure 12A:
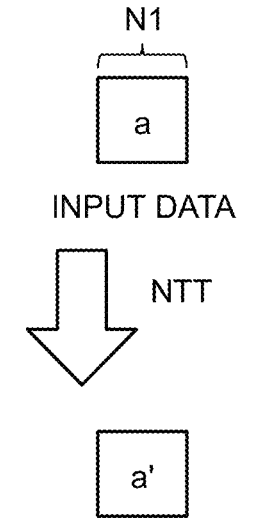
FIG. 12A is a diagram for explaining the procedure of the PA in a row method according to the embodiment.
Figure 12B:
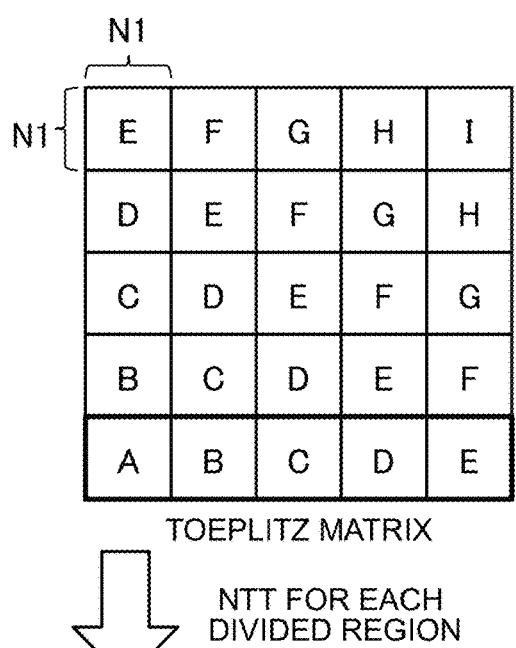
FIG. 12B is a diagram for explaining the procedure of the PA in the row method according to the embodiment.
Figure 12C:
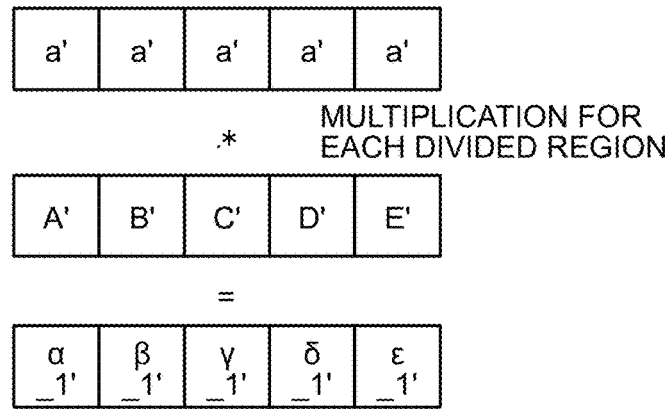
FIG. 12C is a diagram for explaining the procedure of the PA in the row method according to the embodiment.
Figures 12D, 12E:
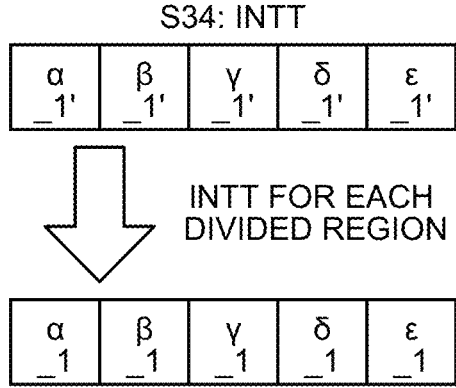
FIG. 12D is a diagram for explaining the procedure of the PA in the row method according to the embodiment.
FIG. 12E is a diagram for explaining the procedure of the PA in the row method according to the embodiment.

To facilitate the following explanation, divided rows and divided columns according to the embodiment are defined as illustrated in FIGS. 10A and 10B.

FIG. 10A is a diagram of definition of the divided columns of the input data according to the embodiment. As illustrated in FIG. 10A, the columns in the input data (EC data) input to the PA processing unit 16 are defined as first to fifth divided columns in order from the right end. The input data is generated in order of the first divided column, the second divided column, the third divided column, the fourth divided column, and the fifth divided column.

FIG. 10B is a diagram of definition of the divided columns and the divided rows of the Toeplitz matrix according to the embodiment. As illustrated in FIG. 10B, the rows in the Toeplitz matrix are defined as first to fifth divided rows in order from the bottom row. The columns in the Toeplitz matrix are defined as first to fifth divided columns in order from the left end.

The PA by the dividing method is divided into two points: one point focusing on each divided column of the T-matrix and the other point focusing on each divided row of the T-matrix. In the present embodiment, the point focusing on each divided column is called a column method, and the point focusing on each divided row is called a row method.

FIGS. 11A to 11E are diagrams for explaining the procedure of the PA in the column method according to the embodiment. First, the NTT arithmetic unit 1621 performs NTT on each divided region of the input data to obtain NTT data for each divided region of the input data (Step S21). In the example in FIG. 11A, the input data is divided into five parts of a to e. The NTT arithmetic unit 1621 performs NTT independently on each of the divided data a to e to obtain the NTT data for each divided region.

Next, the NTT arithmetic unit 1621 performs NTT on each divided region of the first divided column of the T-matrix to obtain the NTT data for each divided region of the T-matrix (Step S22). In the example in FIG. 11B, the first divided column of the T-matrix is divided into five parts of A to E similarly to the input data. The NTT arithmetic unit 1621 performs NTT independently on each of the divided data to obtain the NTT data for each divided region.

Next, the NTT arithmetic unit 1621 multiplies the NTT data for each divided region of the input data and the NTT data for the divided region of the T-matrix (Step S23). In the example in FIG. 11C, the NTT arithmetic unit 1621 multiplies NTT data a' for the divided region a of the input data and NTT data A' for the divided region A of the T-matrix to obtain "α_1'". In the same manner, the NTT arithmetic unit 1621 multiplies NTT data b' and NTT data B' to obtain "α_2'", NTT data c' and NTT data C' to obtain "α_3'", NTT data d' and NTT data D' to obtain "α_4'", and NTT data e' and NTT data E' to obtain "α_5'".

Next, the INTT arithmetic unit 1622 performs INTT on the multiplication data for each divided region (Step S24). In the example in FIG. 11D, the INTT arithmetic unit 1622 performs INTT on "α_1'" to obtain "α_1" and thereafter obtains "α_2" to "α_5" in the same manner.

Next, the data control unit 1623 sequentially performs XOR operation on "α_1" to "α_5" to obtain divided data "α" of the output data (Step S25).

Subsequently, the NTT data memory 1613 retains the NTT data a' to e' for each divided region of the input data obtained at Step S21, and the processing at Steps S22 to S25 is repeatedly performed on the second and subsequent divided columns of the T-matrix to obtain the output data.

FIGS. 12A to 12E are diagrams for explaining the procedure of the PA in the row method according to the embodiment. First, the NTT arithmetic unit 1621 performs NTT on a divided region of the input data to obtain NTT data for the divided region of the input data (Step S31). In the example in FIG. 12A, the NTT arithmetic unit 1621 performs NTT on the divided data a of the input data to obtain NTT data a'.

Next, the NTT arithmetic unit 1621 performs NTT on each divided region of the first divided row of the T-matrix to obtain the NTT data for each divided region of the T-matrix (Step S32). In the example in FIG. 12B, the first divided row of the T-matrix is divided into five parts of A to E. The NTT arithmetic unit 1621 performs NTT independently on each of the divided data A to E to obtain the NTT data for each divided region.

Next, the NTT arithmetic unit 1621 multiplies the NTT data for each divided region of the input data and the NTT data for the divided region of the T-matrix (Step S33). In the example in FIG. 12C, the NTT arithmetic unit 1621 multiplies NTT data a' for the divided region a of the input data and NTT data A' for the divided region A of the T-matrix to obtain "α_1'". In the same manner, the NTT arithmetic unit 1621 multiplies NTT data a' and NTT data B' to obtain "β_1'", NTT data a' and NTT data C' to obtain "γ_1'", NTT data a' and NTT data D' to obtain "δ_1'", and NTT data a' and NTT data E' to obtain "ε_1'".

Next, the INTT arithmetic unit 1622 performs INTT on each divided region of the multiplication data (Step S34). In the example in FIG. 12D, the INTT arithmetic unit 1622 performs INTT on "α_1'" to obtain "α_1" and thereafter obtains "β_1" to "ε_1".

Next, the data control unit 1623 performs XOR operation using the results obtained at Step S34 and updates each divided region of the output data (Step S35). In the example in FIG. 12E, the data control unit 1623 updates "α" by performing XOR operation on "α" and "α_1" and thereafter updates "β" to "ε" in the same manner. Needless to say, the initial values of "α" to "ε" are all zero.

Subsequently, the PA processing unit 16 repeatedly performs the processing at Steps S31 to S35 on each divided region of the input data and each divided row of the T-matrix to update the divided data "α" to "ε" of the output data and obtains the final results.

As described above, the column size used in the T-matrix varies with the compression ratio. For example, when the compression ratio is 0.6 (3/5), the processing need not be performed on all the divided columns in the T-matrix used in FIGS. 11B and 12B and simply needs to be performed only on the first to the third divided columns. Therefore, the range to be subjected to the processing at Steps S22 to S25 in the column method is from the first to the third divided columns, and the range to be subjected to the processing at Steps S32 to S35 in the row method is from the first to the third divided columns.

Note that the document "A Real-Time QKD System Based on FPGA (JOURNAL OF LIGHTWAVE TECHNOLOGY, VOL. 30, NO. 20, Oct. 15, 2012)" does not describe any operation when a huge T-matrix is used.

The following describes the method for reducing the operation using the property of the T-matrix in the point (2). As described above, the T-matrix has the property that the same data appears in the diagonal direction. The same is true in units of divided data separated by the divided regions as illustrated in FIG. 13.

Figure 13:
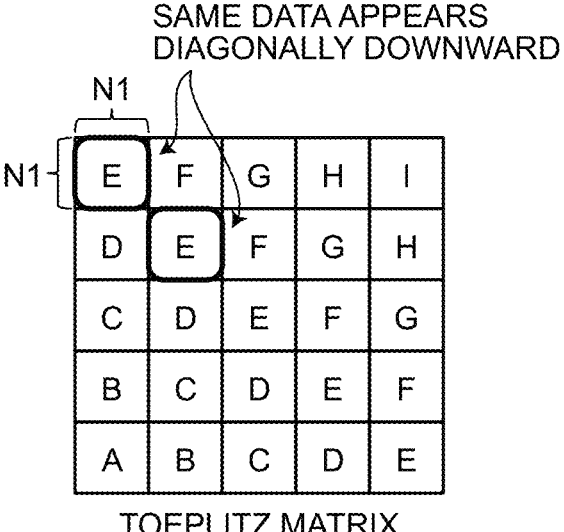
FIG. 13 is a diagram for explaining the property of a T-matrix according to the embodiment.

FIG. 13 is a diagram for explaining the property of the T-matrix according to the embodiment. As illustrated in FIG. 13, for example, the divided data E in the first row of the first divided column appears again in the second row of the second divided column. The processing unit 162 according to the embodiment uses this property of the T-matrix. When the NTT data (second numeric theory translation data) is obtained, the processing unit 162 stores the obtained NTT data in the memory unit 161. If the value of the region of the T-matrix indicated by the divided data to be processed (second divided data) is the same as the value of the region of the T-matrix indicated by the divided data already subjected to numeric theory translation (NTT), the processing unit 162 uses the NTT data stored in the memory unit 161 without performing numeric theory translation on the divided data to be processed.

Figure 14:
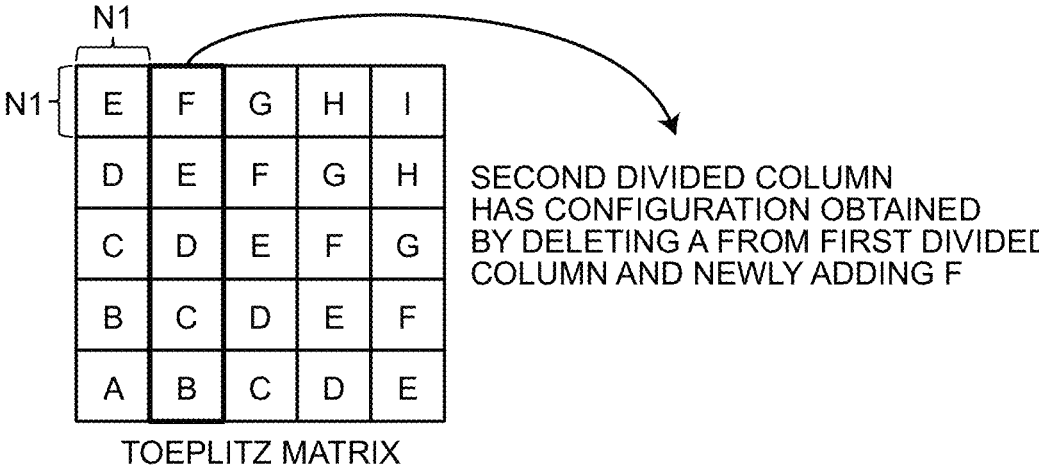
FIG. 14 is a diagram for explaining the characteristics of each divided column of the T-matrix according to the embodiment.

FIG. 14 is a diagram for explaining the characteristics of each divided column of the T-matrix according to the embodiment. In the column method, a certain divided column has a configuration obtained by deleting the lowermost divided data in the adjacent divided column on the left and adding new divided data on the top. In the example in FIG. 14, for example, the second divided column has a configuration obtained by deleting the divided data A from the first divided column and newly adding divided data F.

Figure 15:
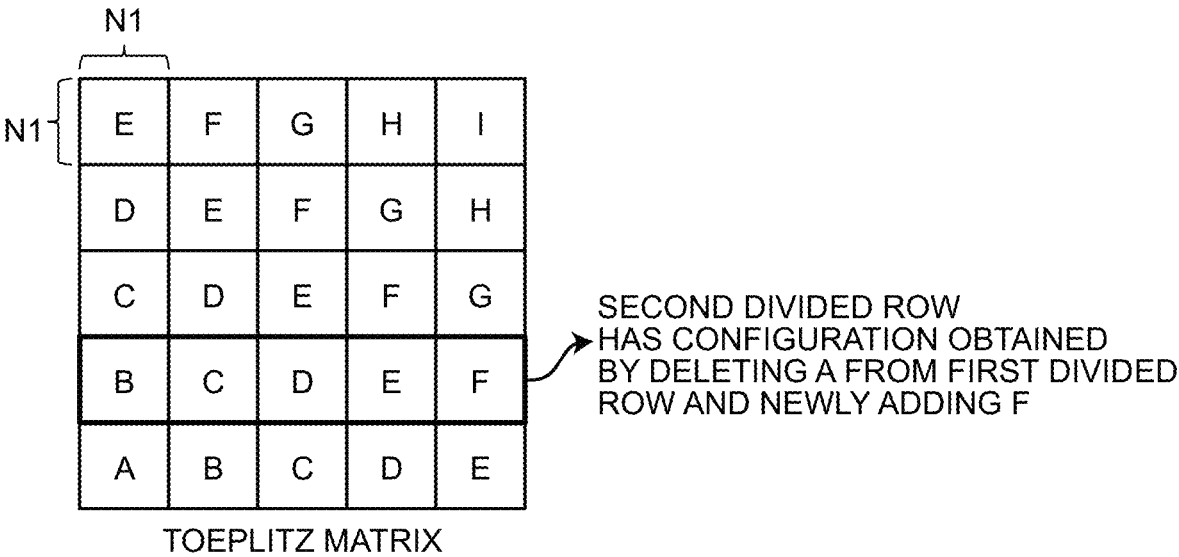
FIG. 15 is a diagram for explaining the characteristics of each divided row of the T-matrix according to the embodiment.

FIG. 15 is a diagram for explaining the characteristics of each divided row of the T-matrix according to the embodiment. In the row method, a certain divided row has a configuration obtained by deleting the leftmost divided data in the adjacent divided row below and adding new divided data on the right. In the example in FIG. 15, for example, the second divided row has a configuration obtained by deleting the divided data A from the first divided row and newly adding the divided data F.

By using the characteristics illustrated in FIGS. 14 and 15, the number of times of NTT at Step S22 in the column method (FIGS. 11A to 11E) and the number of times of NTT at Step S32 in the row method (FIGS. 12A to 12E) can be reduced.

The following describes the reduction in the number of times of NTT in the PA in the column method according to the embodiment.

Figure 16A:
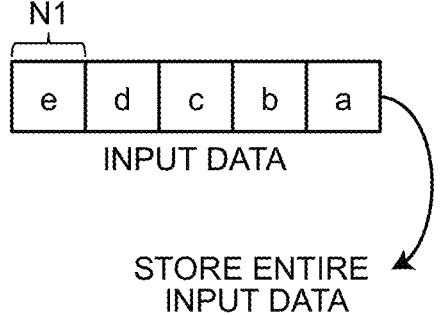
FIG. 16A is a diagram of a storage example of the input data in the PA in the column method according to the embodiment.

FIG. 16A is a diagram of a storage example of the input data in the PA in the column method according to the embodiment. In the PA in the column method, the entire input data is stored in the NTT data memory 1613 for input data.

Figure 16B:
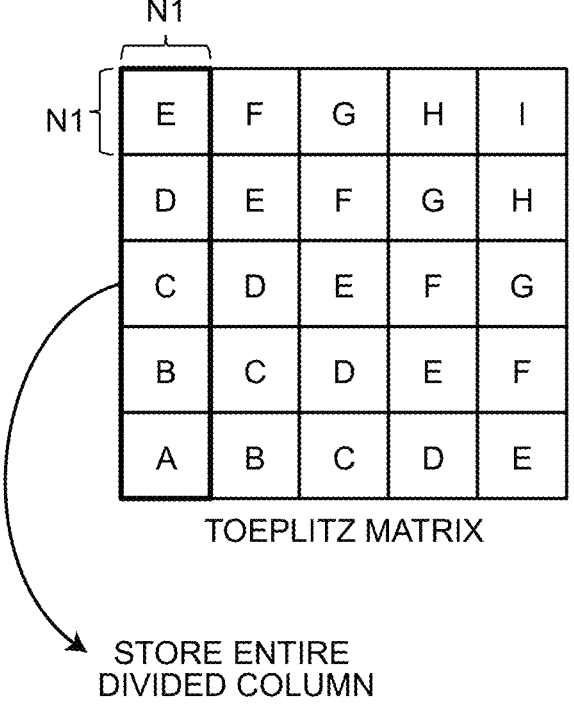
FIG. 16B is a diagram of a storage example of the T-matrix in the PA in the column method according to the embodiment.

FIG. 16B is a diagram of a storage example of the T-matrix in the PA in the column method according to the embodiment. In the PA in the column method, the entire divided column is stored in the NTT data memory 1614 for the T-matrix. In the example in FIG. 16B, each divided column is divided into five regions, and five regions of the NTT data memory 1614 for the divided data are used.

At Step S22 for calculation in the column method, the NTT arithmetic unit 1621 first performs NTT on the first divided column. In the NTT performed on the first divided column for the first time, NTT is performed on all the divided data A to E. In the example in FIG. 16B, NTT is performed on each of the divided data A to E, and the NTT data A' to E' are stored in the NTT data memory 1614.

Next, the NTT arithmetic unit 1621 performs NTT at Step S22 for calculation in the column method on the second divided column. As described above, the second divided column has a configuration obtained by deleting the divided data A of the first divided column and adding the new divided data F instead. Therefore, the NTT arithmetic unit 1621 reuses the NTT data B' to E' obtained in the calculation of the first divided column because the divided data B to E remain. The NTT arithmetic unit 1621 performs NTT only on the newly added divided data F to obtain NTT data F' and stores the NTT data F' in the region of the NTT data memory 1614 where the NTT data A' has been stored. The NTT arithmetic unit 1621 performs NTT on the subsequent divided columns in the same manner.

In other words, in the column method, the processing unit 162 processes a plurality of pieces of divided data (second divided data) in order in units of a column and stores the NTT data (second numeric theory translation data) obtained by performing numeric theory translation (NTT) on the pieces of divided data included in the first divided column in the memory unit 161. If the value of the region of the T-matrix indicated by the divided data to be processed included in the second and subsequent columns is the same as the value of the region of the T-matrix indicated by the divided data already subjected to numeric theory translation, the processing unit 162 uses the NTT data stored in the memory unit 161 without performing numeric theory translation on the divided data to be processed.

As a result, the number of times of NTT can be reduced. In the example in FIG. 16B, if all the divided rows need to be calculated in each divided column, and NTT is performed from the first to the fifth divided columns, it is usually necessary to perform NTT 25 times. By using the property of the T-matrix, the number of times of NTT can be reduced to nine times.

The following describes the reduction in the number of times of NTT in the PA in the row method according to the embodiment. Basically, the concept of the reduction by the row method is the same as that by the column method described above.

Figure 17A:
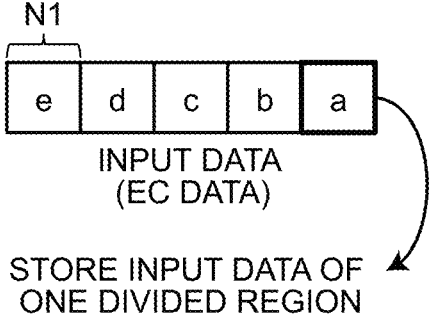
FIG. 17A is a diagram of a storage example of the input data in the PA in the row method according to the embodiment.

FIG. 17A is a diagram of a storage example of the input data in the PA in the row method according to the embodiment. In the PA in the row method, input data of one divided region out of the input data is stored in the NTT data memory 1613 for input data.

Figure 17B:
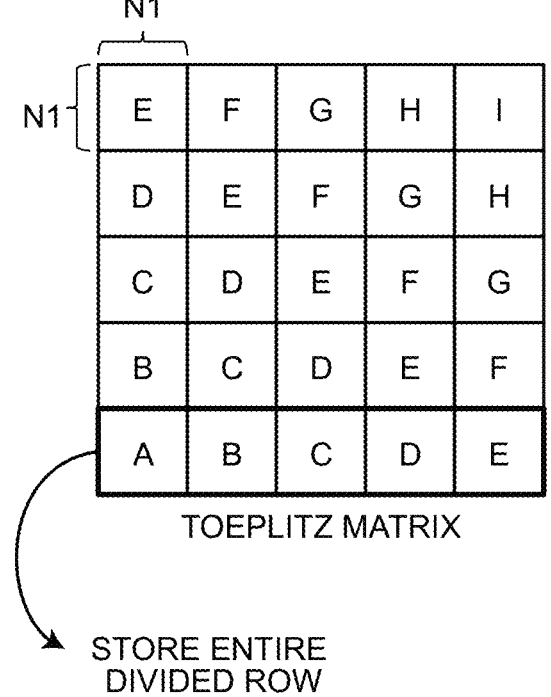
FIG. 17B is a diagram of a storage example of the T-matrix in the PA in the row method according to the embodiment.

FIG. 17B is a diagram of a storage example of the T-matrix in the PA in the row method according to the embodiment. In the PA in the row method, the entire divided row is stored in the NTT data memory 1614 for the T-matrix. In the example in FIG. 17B, each divided row is divided into five regions, and five regions of the NTT data memory 1614 for the divided data are used.

At Step S32 for calculation in the row method, the NTT arithmetic unit 1621 first performs NTT on the first divided row corresponding to the fifth row of the T-matrix. In NTT performed on the first divided row for the first time, NTT is performed on all the divided data A to E. In the example in FIG. 17B, NTT is performed on each of the divided data A to E, and the NTT data A' to E' are stored in the NTT data memory 1614.

Next, the NTT arithmetic unit 1621 performs NTT at Step S32 for calculation in the row method on the second divided row corresponding to the fourth row of the T-matrix. As described above, the second divided row has a configuration obtained by deleting the divided data A of the first divided row and adding the new divided data F instead. Therefore, the NTT arithmetic unit 1621 reuses the NTT data B' to E' obtained in the calculation of the first divided row because the divided data B to E remain. The NTT arithmetic unit 1621 performs NTT only on the newly added divided data F to obtain the NTT data F' and stores the NTT data F' in the region of the NTT data memory 1614 where the NTT data A' has been stored. The NTT arithmetic unit 1621 performs NTT on the subsequent divided rows in the same manner.

In other words, in the row method, the processing unit 162 processes a plurality of pieces of divided data (second divided data) in order in units of a row and stores the NTT data (second numeric theory translation data) obtained by performing numeric theory translation (NTT) on the pieces of divided data included in the first divided row in the memory unit 161. If the value of the region of the T-matrix indicated by the divided data to be processed included in the second and subsequent rows is the same as the value of the region of the T-matrix indicated by the divided data already subjected to numeric theory translation, the processing unit 162 uses the NTT data stored in the memory unit 161 without performing numeric theory translation on the divided data to be processed.

As a result, the number of times of NTT can be reduced. In the example in FIG. 17B, if all the divided columns need to be calculated in each divided row, and NTT is performed from the first to the fifth divided rows, it is usually necessary to perform NTT 25 times. By using the property of the T-matrix, the number of times of NTT can be reduced to nine times.

As described above, the range of the used columns in the T-matrix varies with the compression ratio. If the range of the used columns in the T-matrix varies, the reduction in the number of times of NTT using the property of the T-matrix is basically effective in both the row method and the column method. The only exception is when only the first divided column is in the range of use.

If the range of the used columns in the T-matrix decreases with the compression ratio, the number of times of NTT performed on the divided region can be reduced in both the row method and the column method. For example, when the compression ratio is 0.6 (3/5), the range of the used divided columns is from the first to the third divided columns in FIGS. 16B and 17B. Therefore, the use of the property of the T-matrix can reduce the number of times of required NTT operation to seven times. By contrast, if neither the T-matrix nor the input data is divided, and the number of points of NTT is fixed, the amount of NTT operation on the T-matrix does not change when the compression ratio changes.

Furthermore, in the PA in the row method, when the range of the used columns in the T-matrix changes with the compression ratio, the memory for storing therein the NTT data for the divided data in the T-matrix can be reduced. The maximum value of the amount of memory in the row method is determined by the maximum value of the compression ratio. The maximum value of the compression ratio is the maximum value that can be set in the privacy amplification processing.

In the non-dividing method, for example, the maximum value of the compression ratio is determined by the data size of the input data and the number of points of NTT that can be performed. It is assumed that the data length of the input data is 100 Mbits and the number of points of NTT that can be performed is $2^{27}$(=134,217,728) bits. Considering the following three points: the maximum value of the size of the T-matrix vector is equal to the maximum value of the number of points of NTT that can be performed, the size of the T-matrix vector is (Row Size+Column Size of T-matrix– 1) bits, and the row size of the T-matrix needs to be equal to the input data size, the maximum value of the column size of the T-matrix is 34,217,729 ($=2^27-100$ M+1) bits. The compression ratio is defined by (Column Size of T-matrix/Row Size of T-matrix). Therefore, the maximum value of the compression ratio is approximately 34%.

While the maximum value of the compression ratio is determined by the number of points of NTT that can be performed in the description above, the maximum value of the compression ratio may be determined by the status of the QKD link and other factors.

In the example in FIG. 17B, for example, the compression ratio is 1, and the number of columns is 5. Therefore, the number of regions to store therein the divided rows is 5. By contrast, when the maximum value of the compression ratio is 0.6 (3/5), the number of regions to store therein the divided rows can be reduced from 5 to 3. If the compression ratio is even smaller according to the value of the statistical data of the QKD link, the number of required storages can be further reduced.

The following describes the start timing of the privacy amplification processing in the row method and the method for reducing the memory size for storing the input data.

The column method fails to start the processing until the input data of the same size as the row size of the T-matrix is available. By contrast, when the input data of the divided size is available, the row method can perform the processing independently of the other divided data of the input data. As a result, the size of the input data memory 1611 that stores therein the input data (EC data) in the PA processing unit 16 can be reduced to approximately the size of the divided data, for example.

In other words, in the row method, when the data subjected to the error correction processing reaches the divided data size of the input data (size of the first divided data), the processing unit 162 starts the privacy amplification processing on the data subjected to the error correction processing.

In this method, however, the output data may possibly vary because the compression ratio varies with each divided region. The compression ratio of the PA is calculated based on the statistical data of the input data. Therefore, to perform the processing independently of the other divided data, it is necessary to calculate the compression ratio based on the statistical data of each divided data. Naturally, the compression ratio varies with the statistics. Therefore, the compression ratio for the PA operation varies with each divided region. As a result, the output data sizes of the divided regions are different from each other.

Figure 18:
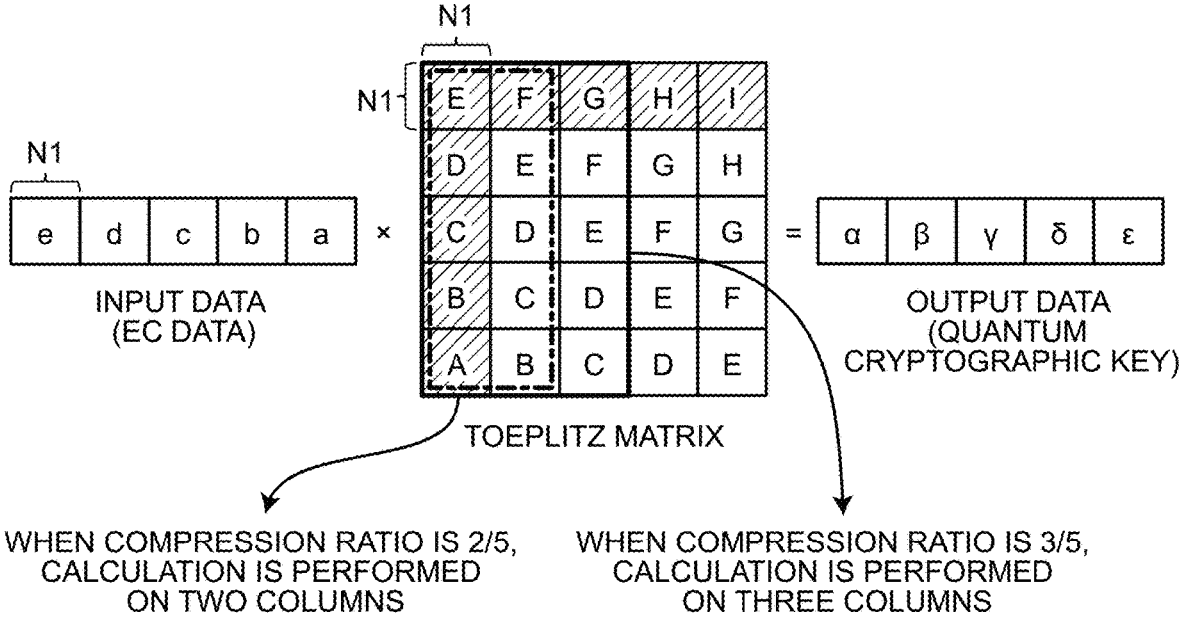
FIG. 18 is a diagram of the number of columns of the T-matrix according to the compression ratio according to the embodiment.

FIG. 18 is a diagram of the number of columns of the T-matrix according to the compression ratio according to the embodiment. When the compression ratio is 2/5 as illustrated in FIG. 18, for example, the calculation of the T-matrix is performed on the two columns from the left of the T-matrix. When the compression ratio is 3/5, for example, the calculation of the T-matrix is performed on the three columns from the left of the T-matrix. The processing unit 162 reduces the number of columns of the T-matrix used in the privacy amplification processing according to the compression ratio of the privacy amplification processing.

FIG. 19 is a diagram for explaining the compression ratio of each divided row in the row method according to the embodiment. The following focuses on the PA operation of the divided data a of the input data and the first divided row and the PA operation of the divided data b of the input data and the second divided row, for example.

The compression ratio of the operation of the divided data a and the first divided row is determined based on statistical data Stat_a for the divided data a, and the compression ratio of the operation of the divided data b and the second divided row is determined based on statistical data Stat_b for the divided data b. Due to the differences between the statistics of Stat_a and Stat_b, the output data size may possibly vary with the operation of each divided row.

Figure 20:
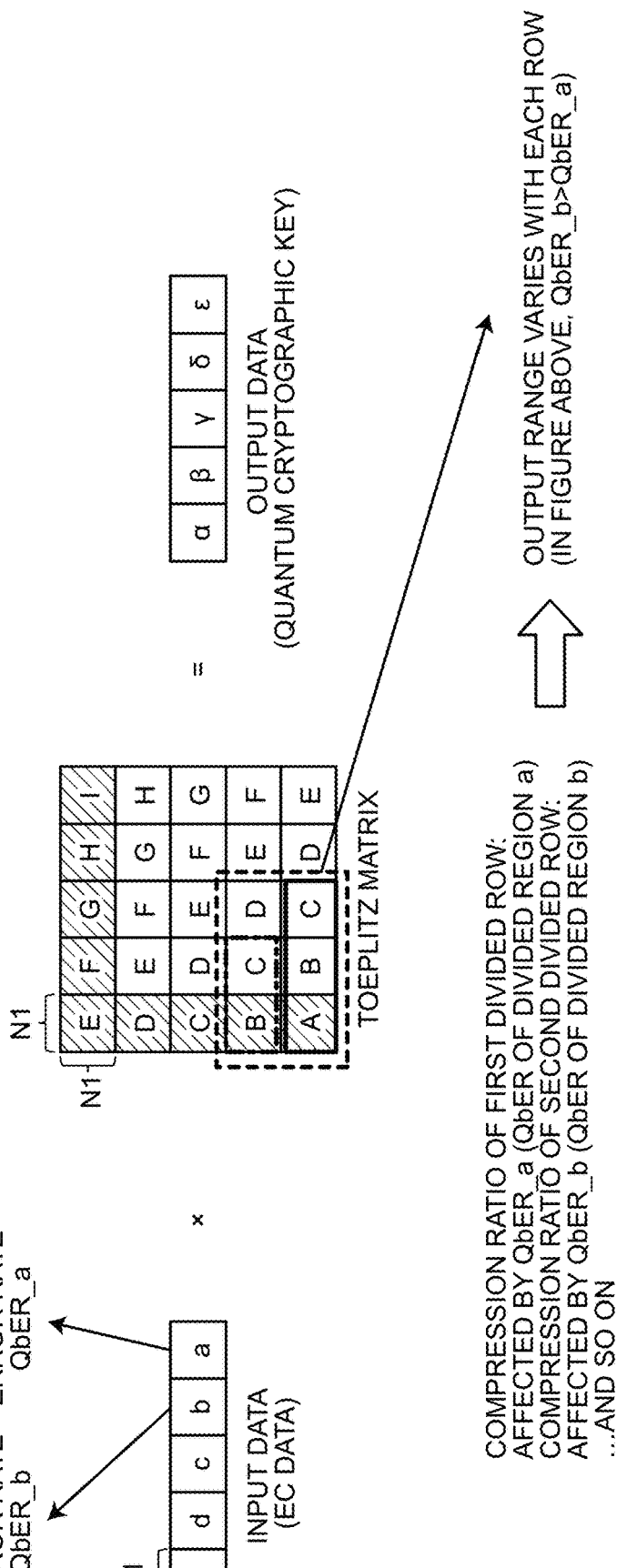
FIG. 20 is a diagram for explaining the compression ratio of each divided row according to a QbER in the row method according to the embodiment.

FIG. 20 is a diagram for explaining the compression ratio of each divided row according to a quantum bit error rate (QbER) in the row method according to the embodiment. A QbER, which is one of the statistical data and the error rate of the QKD link (quantum cryptographic communication channel), for example, naturally fluctuates with the divided section. Therefore, if the fluctuation range is very large, the compression ratios of the divided rows are different from each other, thereby causing the problem that the length of the quantum cryptographic key output from each divided row fluctuates.

The following is a list of the methods to address this problem. Details of the methods will be described layer.

(1) The data control unit 1623 calculates the compression ratio using the history of the compression ratio in the privacy amplification processing or the history of the statistical data.

(2) The data control unit 1623 calculates the compression ratio using the statistical data obtained in advance in the previous sifting processing.

(3) The data control unit 1623 calculates a provisional value of the compression ratio in the divided row to be subjected to the operation and compares the compression ratio in the previous divided row (an example of the first compression ratio) with the provisional compression ratio (an example of the second compression ratio) to determine the compression ratio in the divided row to be subjected to the operation.

(4) The interleaving processing unit 14 performs interleaving (order conversion) processing between the sifting processing and the error correction processing.

In the coping method (1), the data control unit 1623 calculates the compression ratio using the compression ratio calculated in the privacy amplification processing performed in the past and the statistical data for the input data subjected to the past privacy amplification processing, for example. The data control unit 1623 performs the privacy amplification processing by setting the calculated compression ratio without any change as the compression ratio of all the divided rows.

For example, the processing unit 162 determines the compression ratio of each divided row to be subjected to the privacy amplification processing in units of a row based on at least one of the history of the compression ratio in the privacy amplification processing performed in the past and the history of the statistical data of the quantum cryptographic communication channel (QKD link).

Specifically, in the case of the compression ratio, the data control unit 1623 uses the compression ratio of the past privacy amplification without any change as the compression ratio of all the divided rows, for example. In the case of the statistical data, the data control unit 1623 calculates the past compression ratio from the history of the statistical data and uses the calculated compression ratio, for example.

The compression ratio and the statistical data to be used may include, for example, data obtained when the previous privacy amplification processing is performed. This method is effective when the quantum cryptographic communication device is stably driven. If there is no historical data to be referred to remaining, such as calculating the compression ratio for the first time, the data control unit 1623 calculates the compression ratio from the statistical data of the input data before performing the privacy amplification processing.

In the coping method (2), the processing unit 162 determines the compression ratio of each divided row to be subjected to the privacy amplification in units of a row based on the statistical data including an estimated QbER estimated in the sifting processing performed before the privacy amplification processing.

Specifically, the data control unit 1623 obtains in advance the statistical data output in the previous sifting processing before performing the privacy amplification processing, calculates the compression ratio using the obtained statistical data, and sets the calculated compression ratio as the compression ratio of all the divided rows and performs the operation.

In this case, the data control unit 1623 performs calculation using the statistical data for all the input data in the PA. The coping method (2) can be employed when not only optics-related parameters, such as detection of photons, but also the estimated QbER (estimated value of the QbER) can be obtained in the sifting processing. This method is more effective as the estimated QbER is closer to the true value (actual QbER).

In the coping method (3), the processing unit 162 determines a provisional compression ratio from the statistical data of the divided data of the input data (first divided data) to be multiplied by the divided row to be processed. If the provisional compression ratio is lower than the compression ratio used for the divided row previous to the divided row to be processed, the processing unit 162 uses the provisional compression ratio in the privacy amplification processing on the divided row to be processed. If the provisional compression ratio is equal to or higher than the compression ratio used for the divided row previous to the divided row to be processed, the processing unit 162 uses the compression ratio used for the previous divided row in the privacy amplification processing on the divided row to be processed.

Specifically, before the operation of a divided row to be subjected to the operation is started, the data control unit 1623 calculates a provisional value of the compression ratio (provisional compression ratio) of the divided row and compares the compression ratio of the divided row previously subjected to the operation with the provisional compression ratio to determine the compression ratio of the divided row to be subjected to the operation. The data control unit 1623, for example, compares the previous compression ratio with the provisional compression ratio. If the provisional compression ratio is lower than the previous compression ratio, the data control unit 1623 uses the provisional compression ratio as the compression ratio of the divided row to be subjected to the operation. In the opposite case (if the provisional compression ratio is equal to or higher than the previous compression ratio), the data control unit 1623 uses the previous compression ratio as the compression ratio of the divided row to be subjected to the operation.

In the example in FIG. 18, for example, the NTT arithmetic unit 1621 performs the operation on the first, the second, the third, the fourth, and the fifth divided rows in order. To perform the operation of the second divided row, which is the second operation, the data control unit 1623 calculates the provisional compression ratio of the second divided row and compares the provisional compression ratio with the compression ratio used for the operation of the first divided row, which is the first operation, to determine the compression rate of the second divided row.

To calculate the provisional compression ratio, the statistical data of the input data of the divided section corresponding only to the divided row to be subjected to the operation may be used, or the statistical data of the input data of the divided sections corresponding to the divided rows having been subjected to the operation may be used besides the divided row to be subjected to the operation.

Examples of the method for determining the compression ratio in the first operation include a determination method of performing the operation using the provisional compression ratio without any change. Examples of the method also include the determination method of comparing the compression ratio of the past privacy amplification with the provisional compression ratio described in the coping method (1). Examples of the method also include the determination method of comparing the compression ratio calculated from the statistical data obtained in advance in the previous sifting processing with the provisional compression ratio described in the coping method (2).

In the coping method (4), interleaving processing is introduced in the process of generating the quantum cryptographic key. In other words, the input data in the coping method (4) is data obtained by performing interleaving processing and then performing error correction processing on data obtained by performing sifting processing on the photons received via the quantum cryptographic communication channel (QKD link).

Figure 21:
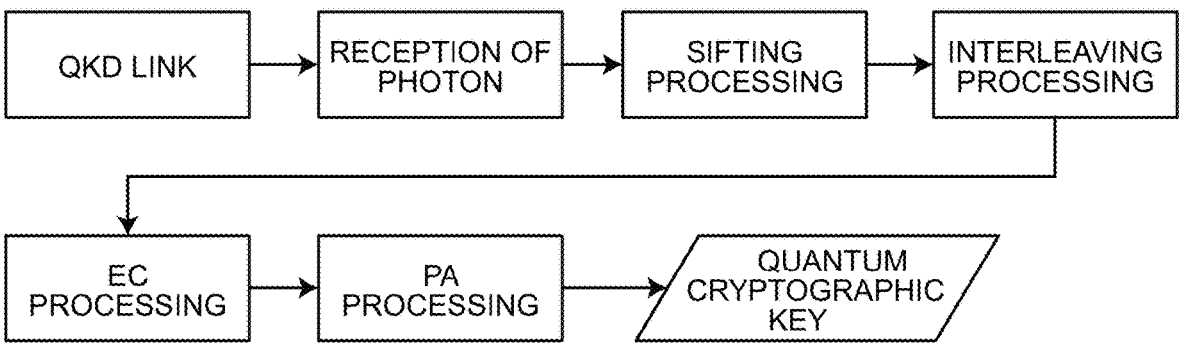
FIG. 21 is a diagram of an outline of generation of the quantum cryptographic key when interleaving processing is introduced according to the embodiment.

FIG. 21 is a diagram of an outline of generation of the quantum cryptographic key when interleaving processing is introduced according to the embodiment. As illustrated in FIG. 21, the coping method (4) is a method of performing interleaving (order conversion) processing before the error correction processing to suppress variations in data and fluctuations in the compression ratio. For example, the QbER fluctuates with each divided section, and the QbER rises especially when the quantum cryptographic device is unstable. By introducing the interleaving, the QbER is smoothed, and the statistical data other than the QbER is simultaneously smoothed. As a result, the fluctuations in the compression ratio of each divided section after the order conversion can be suppressed.

It is most effective that the unit of processing of the interleaving by the interleaving processing unit 14 be equivalent to that of the privacy amplification processing. If this is impractical in terms of the circuit scale, the unit of processing may be smaller. While the range of smoothing by the interleaving is narrower, the advantageous effects of suppressing the variations in the statistical data and the compression ratio can be achieved.

The coping methods (1) to (4) described above may be performed alone, or a plurality of coping methods may be used together. For example, the interleaving in the coping method (4) is processing independent of the coping methods (1) to (3). Therefore, the coping method (4) can be performed simultaneously with the other coping methods, like the coping methods (1) and (4), the coming methods (2) and (4), and the coping methods (3) and (4).

To simultaneously perform the coping methods (3) and (4), however, it is necessary to prepare the statistical data corresponding to the sifted key data resulting from the order conversion considering that the order of the sifted key data is converted by the interleaving and that the coping method (3) calculates the provisional compression ratio using the statistical data of each divided region.

Alternatively, a plurality of coping methods out of the coping methods (1) to (3) may be simultaneously used. In this case, after all the candidate compression ratios calculated by the coping methods (1) to (3) are calculated, one of the candidate compression ratios may be selected.

The compression ratios calculated by the coping methods (1) to (3) may possibly be different from the true value of the compression ratio because they are not calculated using the statistical data of the entire input data and the true value of the QbER. Therefore, after finishing the PA operation on all the divided rows and calculating the output data, the data control unit 1623 may calculate the true value of the compression ratio using the statistical data of the entire input data and the true value of the QbER and derive the output data with a data length based on the true value of the compression ratio.

The PA according to the present embodiment is performed in units of the size of the divided row and the divided column. Naturally, the output bit size based on the compression ratio is not necessarily an integral multiple of the division size. If the output bit size is not an integral multiple, the PA is performed using the divided columns corresponding to the value obtained by rounding up the digits after the decimal point. For example, if the output bit size is 2.2 times the size of the divided column, three divided columns are prepared to perform the PA operation.

Example of the Functional Configuration of the Key Management Device

Figure 22:
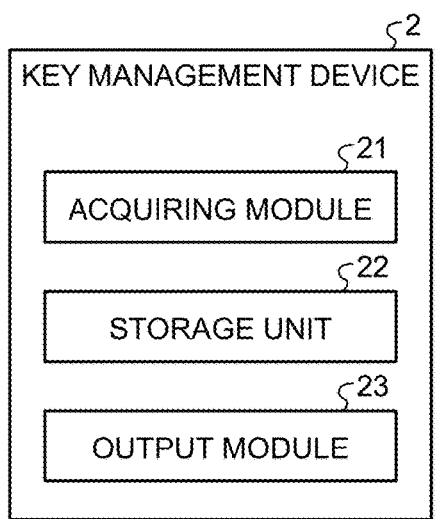
FIG. 22 is a diagram of an example of the functional configuration of a key management device according to the embodiment.

FIG. 22 is a diagram of an example of the functional configuration of the key management device 2 according to the embodiment. The key management device 2 according to the embodiment includes an acquiring module 21, a storage unit 22, and an output module 23. The acquiring module 21 acquires, from the quantum cryptographic communication device 1 (an example of the information processing device), a quantum cryptographic key obtained by performing the privacy amplification processing on the input data. The storage unit 22 stores therein the quantum cryptographic key as an application key used for cryptographic communications for an application of the application device 3. The output module 23 outputs the application key to the application device 3.

As described above, in the information processing unit 12 of the quantum cryptographic communication device 1 (an example of the information processing device) according to the embodiment, the processing unit 162 divides input data based on photons received via the quantum cryptographic communication channel (QKD link) into a plurality of pieces of first divided data and performs numeric theory translation on the pieces of first divided data to obtain first numeric theory translation data of the first divided data. The processing unit 162 also divides a Toeplitz matrix into a plurality of pieces of second divided data and performs numeric theory translation on the pieces of second divided data to obtain second numeric theory translation data of the second divided data. The processing unit 162 performs privacy amplification processing on the input data based on the result obtained by performing inverse numeric theory translation on the multiplication result obtained by multiplying the first numeric theory translation data and the second numeric theory translation data.

With this configuration, the information processing unit 12 of the quantum cryptographic communication device 1 according to the embodiment can perform the privacy amplification processing with less memory usage. Specifically, by dividing the input data and the T-matrix and using the property of the Toeplitz matrix, the information processing unit 12 can reduce the number of times of NTT performed in the privacy amplification processing and the memory size for storing NTT data obtained by NTT.

Finally, examples of the hardware configuration of the quantum cryptographic communication device 1 and the key management device 2 according to the embodiment are described below.

Example of the Hardware Configuration

Figure 23:
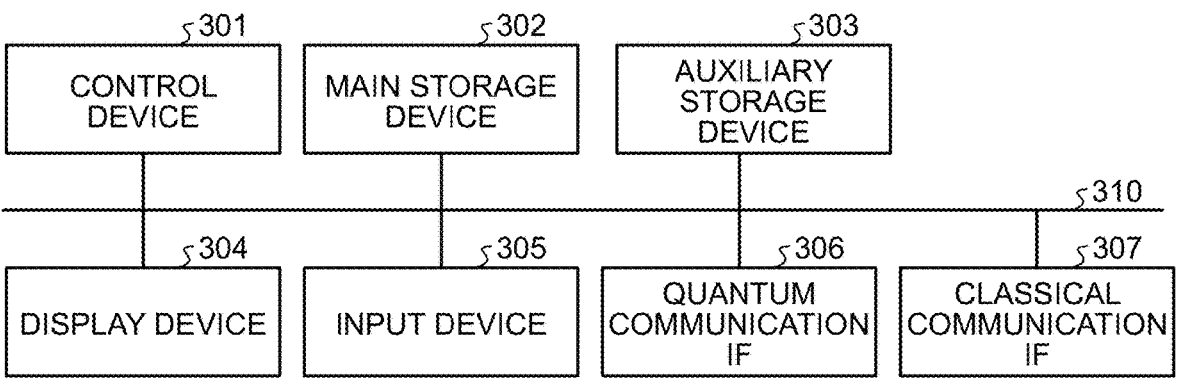
FIG. 23 is a diagram of an example of the hardware configuration of the quantum cryptographic communication device according to the embodiment.

FIG. 23 is a diagram of an example of the hardware configuration of the quantum cryptographic communication device 1 according to the embodiment. The quantum cryptographic communication device 1 according to the embodiment includes a control device 301, a main storage device 302, an auxiliary storage device 303, a display device 304, an input device 305, a quantum communication interface (IF) 306, and a classical communication IF 307.

The control device 301, the main storage device 302, the auxiliary storage device 303, the display device 304, the input device 305, the quantum communication IF 306, and the classical communication IF 307 are connected via a bus 310.

The control device 301 executes a computer program read from the auxiliary storage device 303 to the main storage device 302. The main storage device 302 is a memory, such as a read only memory (ROM) and a random access memory (RAM). The auxiliary storage device 303 is a hard disk drive (HDD), a memory card, or the like.

The display device 304 displays the state of the quantum cryptographic communication device 1, for example. The input device 305 receives an input from a user. The display device 304 and the input device 305 may be provided as a touch panel or the like having both display and input functions. The display device 304 and the input device 305 are not necessarily provided to the quantum cryptographic communication device 1. In this case, the display function and the input function of an external terminal connected to the quantum cryptographic communication device 1 are used, for example.

The quantum communication IF 306 is an interface for connecting the quantum cryptographic communication device 1 to the QKD link through which photons are transmitted. The classical communication IF 307 is an interface for connecting the quantum cryptographic communication device 1 to a transmission channel through which control signals and other signals are transmitted.

Figure 24:
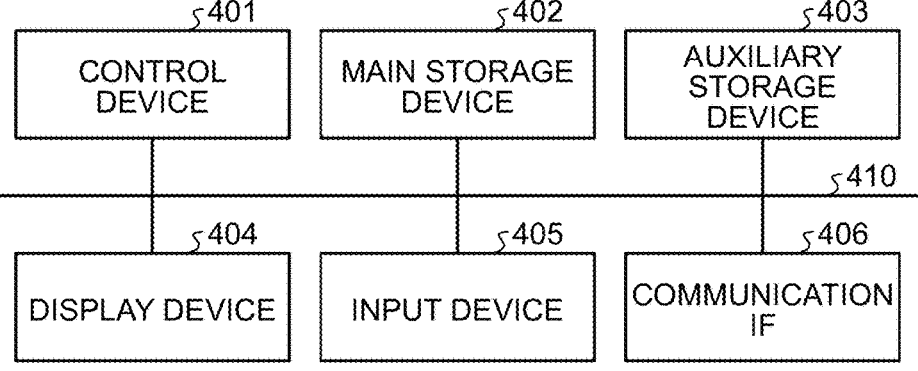
FIG. 24 is a diagram of an example of the hardware configuration of the key management device according to the embodiment.

FIG. 24 is a diagram of an example of the hardware configuration of the key management device 2 according to the embodiment. The key management device 2 according to the embodiment includes a control device 401, a main storage device 402, an auxiliary storage device 403, a display device 404, an input device 405, and a communication IF 406.

The control device 401, the main storage device 402, the auxiliary storage device 403, the display device 404, the input device 405, and the communication IF 406 are connected via a bus 410.

The control device 401 executes a computer program read from the auxiliary storage device 403 to the main storage device 402. The main storage device 402 is a memory, such as a ROM and a RAM. The auxiliary storage device 403 is an HDD, a memory card, or the like.

The display device 404 displays the state of the key management device 2, for example. The input device 405 receives an input from a user. The display device 404 and the input device 405 may be provided as a touch panel or the like having both display and input functions. The display device 404 and the input device 405 are not necessarily provided to the key management device 2. In this case, the display function and the input function of an external terminal connected to the key management device 2 are used, for example.

The communication IF 406 is an interface for connecting the key management device 2 to a transmission channel.

The computer programs executed by the quantum cryptographic communication device 1 and the key management device 2 according to the embodiment are recorded in a computer-readable storage medium, such as a CD-ROM, a memory card, a CD-R, and a digital versatile disc (DVD), as an installable or executable file and provided as a computer program product.

The computer programs executed by the quantum cryptographic communication device 1 and the key management device 2 according to the embodiment may be stored in a computer connected to a network, such as the Internet, and provided by being downloaded via the network.

The computer programs executed by the quantum cryptographic communication device 1 and the key management device 2 according to the embodiment may be provided via a network, such as the Internet, without being downloaded.

The computer programs executed by the quantum cryptographic communication device 1 and the key management device 2 according to the embodiment may be embedded and provided in a ROM, for example.

The computer program executed by the quantum cryptographic communication device 1 according to the embodiment has a module configuration including functions capable of being implemented by the computer program out of the functional components of the quantum cryptographic communication device 1. The functions implemented by the computer program are loaded into the main storage device 302 by the control device 301 reading and executing the computer program from the storage medium, such as the auxiliary storage device 303. In other words, the functions implemented by the computer program are generated on the main storage device 302.

The computer program executed by the key management device 2 according to the embodiment has a module configuration including functions capable of being implemented by the computer program out of the functional components of the key management device 2. The functions implemented by the computer program are loaded into the main storage device 402 by the control device 401 reading and executing the computer program from the storage medium, such as the auxiliary storage device 403. In other words, the functions implemented by the computer program are generated on the main storage device 402.

Part or all of the functions of the quantum cryptographic communication device 1 and the key management device 2 may be provided by hardware, such as an integrated circuit (IC). The IC is a processor that performs dedicated processing, for example.

If the functions are implemented using a plurality of processors, the processors may each implement one of the functions or two or more of the functions.

The quantum cryptographic communication device 1 and the key management device 2 may be operated in any desired operating form. The quantum cryptographic communication device 1 and the key management device 2 may be operated as a quantum cryptographic communication system that performs cryptographic communications in a cloud system on a network, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Notes

The embodiments described above can be summarized in the following technical ideas.

Example 1. An information processing device includes a processor configured to:

divide input data based on photons received via a quantum cryptographic communication channel into a plurality of pieces of first divided data;

obtain first numeric theory translation data of the first divided data by performing numeric theory translation on the plurality of pieces of first divided data;

divide a Toeplitz matrix into a plurality of pieces of second divided data;

obtain second numeric theory translation data of the second divided data by performing numeric theory translation on the plurality of pieces of second divided data; and perform privacy amplification processing on the input data based on a result obtained by performing inverse numeric theory translation on a multiplication result obtained by multiplying the first numeric theory translation data and the second numeric theory translation data.

Example 2. The information processing device according to Example 1 further includes a memory configured to store therein the second numeric theory translation data. The processor is configured to:

store, when the second numeric theory translation data is obtained, the obtained second numeric theory translation data in the memory; and use the second numeric theory translation data stored in the memory without performing numeric theory translation on the second divided data to be processed when a value of a region of the Toeplitz matrix indicated by the second divided data to be processed is the same as a value of a region of the Toeplitz matrix indicated by the second divided data already subjected to numeric theory translation.

Example 3. In the information processing device according to Example 2, the processor is configured to:

process the plurality of pieces of second divided data in order in units of a column;

store in the memory the second numeric theory translation data obtained by performing numeric theory translation on the plurality of pieces of second divided data included in a first divided column; and use the second numeric theory translation data stored in the memory without performing numeric theory translation on the second divided data to be processed included in second and subsequent divided columns, when a value of a region of the Toeplitz matrix indicated by the second divided data to be processed is the same as a value of a region of the Toeplitz matrix indicated by the second divided data already subjected to numeric theory translation.

Example 4. In the information processing device according to Example 2, the processor is configured to:

process the plurality of pieces of second divided data in order in units of a row;

store in the memory the second numeric theory translation data obtained by performing numeric theory translation on the plurality of pieces of second divided data included in a first divided row; and use the second numeric theory translation data stored in the memory without performing numeric theory translation on the second divided data to be processed included in second and subsequent divided rows, when a value of a region of the Toeplitz matrix indicated by the second divided data to be processed is the same as a value of a region of the Toeplitz matrix indicated by the second divided data already subjected to numeric theory translation.

Example 5. In the information processing device according to Example 4, the input data includes data subjected to error correction processing, and the processor is configured to start privacy amplification processing on the data subjected to the error correction processing when the data subjected to the error correction processing reaches a size of the first divided data.

Example 6. In the information processing device according to Example 4 or 5, the processor is configured to determine a first compression ratio of each of divided rows to be subjected to the privacy amplification processing in units of a row based on at least one of a history of a compression ratio in the privacy amplification processing performed in past and a history of statistical data of the quantum cryptographic communication channel.

Example 7. In the information processing device according to Example 4 or 5, the processor is configured to determine a first compression ratio of each of divided rows to be subjected to the privacy amplification processing in units of a row based on statistical data including an estimated quantum bit error rate estimated in sifting processing performed before the privacy amplification processing.

Example 8. In the information processing device according to Example 4 or 5, the processor is configured to:

determine a second compression ratio from statistical data of the first divided data to be multiplied by a divided row to be processed;

use the second compression ratio in the privacy amplification processing on the divided row to be processed, when the second compression ratio is lower than a first compression ratio used for a divided row previous to the divided row to be processed; and use the first compression ratio used for the previous divided row in the privacy amplification processing on the divided row to be processed, when the second compression ratio is equal to or higher than the first compression ratio used for the divided row previous to the divided row to be processed.

Example 9. In the information processing device according to any one of Examples 1 to 8, the input data includes data obtained by performing interleaving processing and then performing error correction processing on data obtained by performing sifting processing on the photons received via the quantum cryptographic communication channel.

Example 10. In the information processing device according to any one of Examples 1 to 9, the processor is configured to reduce a number of columns of the Toeplitz matrix according to a compression ratio of the privacy amplification processing.

Example 11. A quantum cryptographic communication system includes: the information processing device according to any one of Examples 1 to 10; and a key management device. The key management device includes:

a memory; and a processor coupled to the memory and configured to:

acquire, from the information processing device, a quantum cryptographic key obtained by performing privacy amplification processing on the input data;

cause the memory to store therein the quantum cryptographic key as an application key used for cryptographic communication for an application; and output the application key to the application.

Example 12. A key management device includes:

a memory; and a processor coupled to the memory and configured to:

acquire, from an information processing device, a quantum cryptographic key obtained by:

dividing input data based on photons received via a quantum cryptographic communication channel into a plurality of pieces of first divided data;

obtaining first numeric theory translation data of the first divided data by performing numeric theory translation on the plurality of pieces of first divided data;

dividing a Toeplitz matrix into a plurality of pieces of second divided data;

obtaining second numeric theory translation data of the second divided data by performing numeric theory translation on the plurality of pieces of second divided data; and performing privacy amplification processing on the input data based on a result obtained by performing inverse numeric theory translation on a multiplication result obtained by multiplying the first numeric theory translation data and the second numeric theory translation data;

cause the memory to store therein the quantum cryptographic key as an application key used for cryptographic communication for an application; and output the application key to the application.

Example 13. An information processing method includes:

dividing input data based on photons received via a quantum cryptographic communication channel into a plurality of pieces of first divided data;

obtaining first numeric theory translation data of the first divided data by performing numeric theory translation on the plurality of pieces of first divided data;

dividing a Toeplitz matrix into a plurality of pieces of second divided data;

obtaining second numeric theory translation data of the second divided data by performing numeric theory translation on the plurality of pieces of second divided data; and performing privacy amplification processing on the input data based on a result obtained by performing inverse numeric theory translation on a multiplication result obtained by multiplying the first numeric theory translation data and the second numeric theory translation data.

Example 14. A computer program product comprising a computer-readable medium including programmed instructions, the instructions causing a computer to execute:

dividing input data based on photons received via a quantum cryptographic communication channel into a plurality of pieces of first divided data;

obtaining first numeric theory translation data of the first divided data by performing numeric theory translation on the plurality of pieces of first divided data;

dividing a Toeplitz matrix into a plurality of pieces of second divided data;

obtaining second numeric theory translation data of the second divided data by performing numeric theory translation on the plurality of pieces of second divided data; and performing privacy amplification processing on the input data based on a result obtained by performing inverse numeric theory translation on a multiplication result obtained by multiplying the first numeric theory translation data and the second numeric theory translation data.

What is claimed is:

1. An information processing device comprising:

a hardware processor configured to:

divide input data based on photons received via a quantum cryptographic communication channel into a plurality of pieces of first divided data;

obtain first numeric theory translation data of the first divided data by performing numeric theory translation on the plurality of pieces of first divided data;

divide a Toeplitz matrix into a plurality of pieces of second divided data;

obtain second numeric theory translation data of the second divided data by performing numeric theory translation on the plurality of pieces of second divided data; and perform privacy amplification processing on the input data based on a result obtained by performing inverse numeric theory translation on a multiplication result obtained by multiplying the first numeric theory translation data and the second numeric theory translation data; and a memory configured to store therein the second numeric theory translation data, wherein the hardware processor is configured to:

store, when the second numeric theory translation data is obtained, the obtained second numeric theory translation data in the memory; and use the second numeric theory translation data stored in the memory without performing numeric theory translation on the second divided data to be processed when a value of a region of the Toeplitz matrix indicated by the second divided data to be processed is the same as a value of a region of the Toeplitz matrix indicated by the second divided data already subjected to numeric theory translation.

2. The device according to claim 1, wherein the hardware processor is configured to:

process the plurality of pieces of second divided data in order in units of a column;

store in the memory the second numeric theory translation data obtained by performing numeric theory translation on the plurality of pieces of second divided data included in a first divided column; and use the second numeric theory translation data stored in the memory without performing numeric theory translation on the second divided data to be processed included in second and subsequent divided columns, when a value of a region of the Toeplitz matrix indicated by the second divided data to be processed is the same as a value of a region of the Toeplitz matrix indicated by the second divided data already subjected to numeric theory translation.

3. The device according to claim 1, wherein the hardware processor is configured to:

process the plurality of pieces of second divided data in order in units of a row;

store in the memory the second numeric theory translation data obtained by performing numeric theory translation on the plurality of pieces of second divided data included in a first divided row; and use the second numeric theory translation data stored in the memory without performing numeric theory translation on the second divided data to be processed included in second and subsequent divided rows, when a value of a region of the Toeplitz matrix indicated by the second divided data to be processed is the same as a value of a region of the Toeplitz matrix indicated by the second divided data already subjected to numeric theory translation.

4. The device according to claim 3, wherein the input data includes data subjected to error correction processing, and the hardware processor is configured to start privacy amplification processing on the data subjected to the error correction processing when the data subjected to the error correction processing reaches a size of the first divided data.

5. The device according to claim 3, wherein the hardware processor is configured to determine a first compression ratio of each of divided rows to be subjected to the privacy amplification processing in units of a row based on at least one of a history of a compression ratio in the privacy amplification processing performed in past and a history of statistical data of the quantum cryptographic communication channel.

6. The device according to claim 3, wherein the hardware processor is configured to determine a first compression ratio of each of divided rows to be subjected to the privacy amplification processing in units of a row based on statistical data including an estimated quantum bit error rate estimated in sifting processing performed before the privacy amplification processing.

7. The device according to claim 3, wherein the hardware processor is configured to:

determine a second compression ratio from statistical data of the first divided data to be multiplied by a divided row to be processed;

use the second compression ratio in the privacy amplification processing on the divided row to be processed, when the second compression ratio is lower than a first compression ratio used for a divided row previous to the divided row to be processed; and use the first compression ratio used for the previous divided row in the privacy amplification processing on the divided row to be processed, when the second compression ratio is equal to or higher than the first compression ratio used for the divided row previous to the divided row to be processed.

8. The device according to claim 3, wherein the input data includes data obtained by performing interleaving processing and then performing error correction processing on data obtained by performing sifting processing on the photons received via the quantum cryptographic communication channel.

9. The device according to claim 1, wherein the hardware processor is configured to reduce a number of columns of the Toeplitz matrix according to a compression ratio of the privacy amplification processing.

10. A quantum cryptographic communication system comprising:

an information processing device comprising:

a hardware processor configured to:

divide input data based on photons received via a quantum cryptographic communication channel into a plurality of pieces of first divided data;

obtain first numeric theory translation data of the first divided data by performing numeric theory translation on the plurality of pieces of first divided data;

divide a Toeplitz matrix into a plurality of pieces of second divided data;

obtain second numeric theory translation data of the second divided data by performing numeric theory translation on the plurality of pieces of second divided data; and perform privacy amplification processing on the input data based on a result obtained by performing inverse numeric theory translation on a multiplication result obtained by multiplying the first numeric theory translation data and the second numeric theory translation data; and a key management device, the key management device comprising:

a memory; and a hardware processor coupled to the memory and configured to:

acquire, from the information processing device, a quantum cryptographic key obtained by performing privacy amplification processing on the input data;

cause the memory to store therein the quantum cryptographic key as an application key used for cryptographic communication for an application; and output the application key to the application.

11. A key management device comprising:

a memory; and a hardware processor coupled to the memory and configured to:

acquire, from an information processing device, a quantum cryptographic key obtained by:

dividing input data based on photons received via a quantum cryptographic communication channel into a plurality of pieces of first divided data;

obtaining first numeric theory translation data of the first divided data by performing numeric theory translation on the plurality of pieces of first divided data;

dividing a Toeplitz matrix into a plurality of pieces of second divided data;

obtaining second numeric theory translation data of the second divided data by performing numeric theory translation on the plurality of pieces of second divided data; and performing privacy amplification processing on the input data based on a result obtained by performing inverse numeric theory translation on a multiplication result obtained by multiplying the first numeric theory translation data and the second numeric theory translation data;

cause the memory to store therein the quantum cryptographic key as an application key used for cryptographic communication for an application; and output the application key to the application.

12. An information processing method comprising:

dividing input data based on photons received via a quantum cryptographic communication channel into a plurality of pieces of first divided data;

obtaining first numeric theory translation data of the first divided data by performing numeric theory translation on the plurality of pieces of first divided data;

dividing a Toeplitz matrix into a plurality of pieces of second divided data;

obtaining second numeric theory translation data of the second divided data by performing numeric theory translation on the plurality of pieces of second divided data; and performing privacy amplification processing on the input data based on a result obtained by performing inverse numeric theory translation on a multiplication result obtained by multiplying the first numeric theory translation data and the second numeric theory translation data, wherein when the second numeric theory translation data is obtained, the obtained second numeric theory translation data is stored in a memory; and the second numeric theory translation data stored in the memory is used without performing numeric theory translation on the second divided data to be processed when a value of a region of the Toeplitz matrix indicated by the second divided data to be processed is the same as a value of a region of the Toeplitz matrix indicated by the second divided data already subjected to numeric theory translation.

13. A computer program product comprising a non-transitory computer-readable medium including programmed instructions, the instructions causing a computer to execute:

dividing input data based on photons received via a quantum cryptographic communication channel into a plurality of pieces of first divided data;

obtaining first numeric theory translation data of the first divided data by performing numeric theory translation on the plurality of pieces of first divided data;

dividing a Toeplitz matrix into a plurality of pieces of second divided data;

obtaining second numeric theory translation data of the second divided data by performing numeric theory translation on the plurality of pieces of second divided data; and performing privacy amplification processing on the input data based on a result obtained by performing inverse numeric theory translation on a multiplication result obtained by multiplying the first numeric theory translation data and the second numeric theory translation data, wherein when the second numeric theory translation data is obtained, the obtained second numeric theory translation data is stored in a memory storing therein the second numeric theory translation data; and the second numeric theory translation data stored in the memory is used without performing numeric theory translation on the second divided data to be processed when a value of a region of the Toeplitz matrix indicated by the second divided data to be processed is the same as a value of a region of the Toeplitz matrix indicated by the second divided data already subjected to numeric theory translation.

* * * * *